US007313449B1

(12) United States Patent
Ciolfi et al.

(10) Patent No.: US 7,313,449 B1
(45) Date of Patent: Dec. 25, 2007

(54) HANDSHAKING CONFIGURATION MECHANISMS IN GRAPHICAL PROGRAMMING ENVIRONMENTS

(75) Inventors: John Ciolfi, Wellesley, MA (US); Haihua Feng, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 352 days.

(21) Appl. No.: 11/068,948

(22) Filed: Feb. 28, 2005

(51) Int. Cl.
*G05B 11/01* (2006.01)
*G06F 17/50* (2006.01)
(52) U.S. Cl. .......................................... 700/21; 703/17
(58) Field of Classification Search .................. 700/21; 703/17
See application file for complete search history.

(56) References Cited

U.S. PATENT DOCUMENTS

| 6,633,869 | B1 * | 10/2003 | Duparcmeur et al. .......... 707/6 |
| 6,820,042 | B1 * | 11/2004 | Cohen et al. .................. 703/2 |
| 7,089,223 | B2 * | 8/2006 | Bartlett et al. ................ 706/47 |
| 2004/0210592 | A1 | 10/2004 | Ciolfi et al. |
| 2004/0210685 | A1 | 10/2004 | Orofino, II et al. |
| 2005/0216248 | A1 * | 9/2005 | Ciolfi et al. .................. 703/22 |

OTHER PUBLICATIONS

Mosterman et al., "Using Interleaved Execution to Resolve Cyclic Dependencies in Time-Based Block Diagrams" 2004 IEEE Conference; p. 4057-4062.*

* cited by examiner

*Primary Examiner*—Anthony Knight
*Assistant Examiner*—Tom Stevens
(74) *Attorney, Agent, or Firm*—Lahive & Cockfield, LLP

(57) ABSTRACT

Graphical programming or modeling environments, such as a block diagram environment, are disclosed in which graphical programs or models are configured using handshaking communication between entities of the graphical programs or models. The graphical programming or modeling environments provide mechanisms for the handshaking configuration of graphical programs/models before the graphical programs/models are executed in the graphical programming/modeling environments.

19 Claims, 23 Drawing Sheets

Sorted List: ← 128

0:0  Sine Wave 1
0:1  Sine Wave 2
0:2  Function-Call Generator
0:3  Function-Call Subsystem
0:4  Integrator
0:5  Gain (algebraic id 0#1)
0:6  Sum (algebraic variable for id 0#1)
0:7  Out1

*Fig. 6B*

HANDSHAKING CONFIGURATION MECHANISMS IN GRAPHICAL PROGRAMMING ENVIRONMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to graphical programming or modeling environments, in particular to methods, systems and mediums for providing mechanisms for the handshaking configuration of a graphical program or model in the graphical programming or modeling environments.

BACKGROUND OF THE INVENTION

Dynamic systems are characterized by the fact that their behaviors change over time and are representative of many real-world systems. The dynamic systems are typically modeled as sets of differential, difference, and/or algebraic equations. At any given instant of time, these equations may be viewed as relationships between the system's output response ("outputs"), the system's input stimuli ("inputs") at that time, the current state of the system, the system parameters, and time. The state of the system may be thought of as a numerical representation of the dynamically changing configuration of the system. For instance, in a physical system modeling a simple pendulum, the state may be viewed as the current position and velocity of the pendulum. Similarly, a signal-processing system that filters a signal would maintain a set of previous inputs as the state. The system parameters are the numerical representation of the static (unchanging) configuration of the system and may be viewed as constant coefficients in the system's equations. For the pendulum example, a parameter is the length of pendulum and for the filter example; a parameter is the values of the filter taps.

There are four common types of mathematical models used in the study of dynamic systems. The first type of mathematical model describes systems using ordinary differential equations (ODEs). This type of dynamic system specifies a set of two equations: Output and Derivative. The Output equation facilitates the computation of the system's output response at a given time instant as a function of its inputs, states, parameters, and time. The Derivative equation is an ordinary differential equation that allows the computation of the derivative of the states at the current time as a function of the inputs, the states, parameters, and time. This class of models is suitable for systems in which it is important to track the system response as a continuous function of time. Such continuous-time systems are commonly representative of physical systems (mechanical, thermal, electrical). For simple systems, it may be possible to use the Output and Derivative equations to obtain a closed-form solution for the output response y(t). But in most complex real world systems, the response of the system is obtained by integrating the states through numerical means.

The definition of an ODE used herein encompasses both implicit and explicit differential equations. The class of ordinary differential equations may require additional equations to define the system being modeled. For example, equations called projections may be required to impose constraints on the differential variables (e.g., states $X_1$ and $X_2$ must fall on the manifold defined by $x_1^2+x_2^2=25$). These constraints can be either applied as a secondary condition or a coupled condition to the differential equation. Although systems including the projections may conventionally no longer qualify as an ODE; they are included here to simplify the categories of systems. Another example is the use of a Jacobian equation that defines partial derivatives with respect to the independent and/or differential variables. The Jacobian equation is typically used when obtaining a linear approximation of a non-linear model or an overall linear model of a set of equations. Jacobian equations are required for some forms of numerical integration, for producing the linear model once the model has reached its steady state operating point, etc. The Output and Derivatives equations may be extended to define other relationships for the block. For example, the Output equation may help manage its states by defining a relationship where it resets the state back to a known quantity at a specific point in time or when a specific condition is seen.

Another type of mathematical model describes systems using difference equations. This type of the dynamic system specifies a set of two equations: Output and Update. The Output equation facilitates the computation of the system's output response at a given time instant as a function of the inputs, states at some previous time, parameters, and time. The Update equation is a difference equation that allows the computation of the states at the current time as a function of the inputs, states at some previous time, parameters, and time. This class of models is suitable for systems in which it is important to track the system response at discrete points in time. Such discrete-time systems are commonly representative of discrete-time control and digital signal processing systems. For simple systems, it may be possible to use the Output and Update equations to obtain a closed-form solution for the output response y(t). But in most complex real world systems, the response of the system is solved through recursion. The Output and Update equations are applied repeatedly to solve for the system response over a period of time.

An additional type of mathematical model describes systems using algebraic equations. This type of the dynamic system uses an algebraic equation that needs to be solved at each time to obtain the outputs. While simple systems may allow one to obtain a closed-form solution for the system inputs and outputs, practical algebraic equations may best be solved iteratively using a numerical method involving both perturbations and iterations. Algebraic equation solving techniques used in the context of dynamic system modeling are discussed in greater detail below.

A fourth type of mathematical model is a composite system that has components that fall into the three types of models discussed above. Most complex real-world system models fall into this category. This class of systems has Output, Derivative, Update, and potentially other equations. Solving for the output response of such systems requires a combination of the solution approaches discussed for all of the classes above. One example of a composite system is one described by differential-algebraic equations (DAEs) which contain both differential equations and algebraic equations.

Grouped within the composite class of systems are many extensions involving relationships (equations) defined in terms of both outputs and state. For example, one can define a limited integration relationship for a differential variable. This relationship requires a set of equations that consists of the Output equation, an Update equation, a Derivative equation, and a Zero Crossing equation. The Zero Crossing equation defines the points in time where the upper and lower limits of the limited integration occur. Another example of an extension is the notion of Enable and Disable equations that define relationships among states or signals when parts of a system are activated and deactivated during execution.

Inherent in the four classes of systems (ODE, difference equations, algebraic equations and composite) is the notion of system sample time. The sample-time is the time interval at which the inputs, state, or outputs (collectively referred to as the results) of the system are traced as time progresses. Based on sample times, a system can be described as a discrete-time system, continuous-time system and hybrid system.

A discrete-time system is a system in which the evolution of the system results is tracked at finite intervals of time. In the limit as the interval approaches zero, the discrete-time system becomes a continuous-time system. The intervals of time may be periodic or non-periodic. Sometimes, non-periodic rate systems are referred to as nonuniform-rate systems meaning that there is no periodic rate at which the response can be tracked. Nonuniform-rate systems can fall into the class of composite systems where an additional equation (GetTimeOfNextVarHit) defines when in the future the other equations associated with the system should be evaluated. A continuous-time system is a system in which the evolutions of the system results are continuously changing. Continuous-time signals change during numerical integration (minor time steps). An example of a continuous-time system is one described by an ODE. There can also be algebraic or composite continuous-time systems. A hybrid system is a system with both discrete-time and continuous-time elements.

If a system has only one sample time, it is said to be single-rate. If a system has multiple sample times, it is said to be multi-rate. Multi-rate systems can be evaluated (executed) using either a single-tasking form of execution or a multi-tasking form of execution. When multi-tasking execution is used, it conforms to rate monotonic scheduling principles as defined by Liu, C. L., and Layland, J. W. *Scheduling Algorithms for Multiprogramming in a Hard-Real-Time Environment*. ACM 20, 1 (January 1973), 46-61. Systems may also be categorized by the type of numerical integration solver being used. A fixed-step system is one that uses a fixed-step solver. Fixed-step solvers often use explicit methods to compute the next continuous state at fixed periodic intervals of time. A variable-step system is one that is using a variable-step solver. A variable-step solver can use either implicit or explicit methods to compute the next continuous state at non-periodic intervals of time. Generally, variable-step solvers use a form of error control to adjust the interval size such that the desired error tolerances are achieved.

An execution context (EC) is a data structure for a group of blocks that all execute when an associated pre-condition is satisfied. Blocks may inherit and define ECs, just as prior modeling software allowed inheriting and defining sample times in blocks. EC information may also be propagated throughout the block diagram allowing blocks to opt into or out of an EC's grouping. ECs are not confined to time-based block diagrams and may be extended to provide execution efficiency in the context of data flow and other block diagram models.

An EC may be defined to be a hierarchical partitioning of a block diagram into groups of blocks that execute only when a pre-condition is fulfilled. An EC may be viewed as the generalization of the notion of a conditionally executed (CE)-Subsystem; the generalization being removal of the restriction that the execution pre-condition is associated strictly with a subsystem. Similar to CE-Subsystems, ECs can be nested within each other to obtain arbitrary levels of hierarchy. Unlike a CE-Subsystem, which imposes the implicit restriction that blocks have to live within the Subsystem to execute in accordance with a pre-condition, an EC may be associated with any block as an explicit attribute (similar to sample times).

Each block in the block diagram is parented by one of the ECs created in the block diagram. A block's EC information may be thought of as a block attribute similar to its sample time. A particular block executes only when the pre-condition of its parent EC is satisfied, activating the EC. Furthermore, the block executes in accordance to its sample time once its parent EC has been activated.

The EC can be created and associated with individual block diagram elements and/or subsystems. The EC allows execution of the associated element or subsystem upon satisfaction of a specified pre-condition. The EC may be inherited by other elements and subsystems in the block diagram and propagated programmatically throughout the block diagram. The use of the EC allows for efficient code generation and block diagram execution, as well as supporting modular design concepts.

The EC technology is described in more detail in a pending application entitled "A SYSTEM AND METHOD FOR USING EXECUTION CONTEXTS IN BLOCK DIAGRAM MODELING" (U.S. patent application Ser. No. 10/414,644) filed on Apr. 16, 2003.

In practice, except for the most basic systems, mathematical models for dynamic systems involve a complex set of mathematical transformations applied in some prescribed manner with the outputs of some transformations forming the inputs of others. Each elemental transformation may be viewed in isolation as a simple dynamic system falling into one of the categories listed above. Therefore, a complex dynamic system may be modeled as an interconnection of various simple dynamic systems. A schematic representation of such an interconnection that has evolved over the years is the block diagram. Such block diagram models have now become a standard means in textbooks, design papers, journal articles, and specifications to communicate the details of a dynamic system's behavior.

A block diagram model of a dynamic system is represented schematically as a collection of blocks interconnected by lines that represent signals. A signal represents the input and output of a dynamic system. Each block represents an elemental dynamic system. A line emanating at one block and terminating at another signifies that the output of the first block is an input to the second block. Each distinct input or output on a block is referred to as a port. Signals correspond to the time-varying quantities represented by each line connection and are assumed to have values at each time instant. The source block of a signal writes to the signal at a given time instant when its system equations are solved. The destination blocks of this signal read from the signal when their system equations are being solved. The block diagram includes a plurality of blocks, lines and ports that are interconnected. Those skilled in the art will recognize that the term "blocks" does not refer exclusively to elemental dynamic systems but may also include other modeling elements that aid in readability and modularity of block diagrams.

The theory of Digital Signal Processing (DSP) focuses on modeling signals as sequences of samples. This view naturally fits into the time-based block diagram paradigm by mapping the samples u[n] to discrete-time points $u(t_k)$. This adds the benefit of being able to model the interaction between DSP systems and other classes of time-based systems, e.g. continuous and/or discrete-time control systems.

Put another way, block diagram models are time-based relationships between signals and state variables representative of a dynamic system. The solution (computation of system response) of the model is obtained by evaluating these relationships over time, where time starts at a user-specified "start time" and either ends at a user-specified "stop time" or based on evaluating a criterion that may involved model quantities. At each time step these relationships are evaluated. Signals represent quantities that change over time, and these quantities are defined for all points in time between the block diagram's start and stop time. The relationships between signals and state variables are defined by sets of equations represented by blocks. These equations define a relationship between the input signals, output signals, state, and time. Inherent in the definition is the notion of parameters, which are the coefficients of the equations.

The block diagrams are not exclusively used for representing time-based dynamic systems but also for other models of computation. For instance, flow-charts are block diagrams used to capture process flow and are not generally suitable for describing dynamic system behavior. Data flow block diagrams are block diagrams that describe a graphical programming paradigm where the availability of data (often thought of as tokens) is used to initiate the execution of blocks, where a block represents an operation and a line represents execution dependency describing the direction of data flowing between blocks. As used herein, the term block diagrams means time-based block diagrams used in the context of dynamic systems except as otherwise noted.

Execution of a block diagram generally proceeds in a couple of stages including compilation, initialization and execution or simulation loops. The compilation stage incorporates library blocks into the block diagram, propagates signal dimensions, data types, and sample times, evaluates parameters, determines block sorted orders, and allocates memory for output/input buffers, states, parameters, etc. The initialization stage executes Model Start method, which in turn calls each block's Block Start method. In the Block Start method, blocks do various tasks, such as checking parameters and writing out the initial output signals. The initialization stage then calls the Model Initialize method, which calls each block's Block Initialize method. In this method, the state of the block is initialized. After the initialization stage, the block diagram enters the execution or simulation loop, where each pass through the loop is referred as an execution or simulation step. During each of these steps, various block methods, such as Block Outputs method, Block Derivatives method and Block Update method, are invoked to compute outputs, derivatives and states for each block. The simulation loop continues until the final time of the execution is reached or a termination request is issued.

In the conventional initialization stage, blocks in a block diagram fall into one of two types. The first type is the blocks that know their output prior to model execution and can write out an initial output value in the initialization stage. For example, in Simulink® the Constant block knows it output prior to model execution and writes out a specified value in its Block Start method. The second type is the blocks that don't explicitly know their output prior to model execution and thus can't write out an initial output value before simulation starts. For example, the Gain block does not write out an initial output value in its Block Start method. Whether to write out an initial output value in the Block Start method is pre-determined by individual blocks. The predetermined initialization of the conventional mechanism has the following problems.

Initial Condition Leakage

If an Enabled Subsystem block includes a Constant block, the Constant block writes out an initial output value in its Block Start method (which is part of initialization) even before the Enabled Subsystem block is enabled. This initial value is seen from the outside of the Enabled Subsystem block, such as a Scope block coupled to the Enabled Subsystem block. The conventional initialization mechanism therefore results in an initial condition leakage.

Unnecessary Initialization

If the output port of a Constant block is coupled to the input port of a Gain block, the Constant block does not need to write out its initial output value in its Block Start method because the output value of the Constant block is not needed until the block diagram enters the simulation loop. However, in the conventional initialization mechanism, the Constant block always performs an unnecessary initialization of its output.

Less Optimal Partition of Initialization Tasks

Assuming that Integrator block has an external initial condition (IC) input port and the Integrator block wants to read an IC input value and use this value to initialize the state in its Block Initialize method, as depicted in FIG. 17. In the conventional initialization mechanism, the Block Initialize method does not actually set the initial value for the state, and the state initialization task becomes part of the Block Outputs method called in the simulation loop. This is because the Integrator block does not know whether the source output port of the IC port can write out an initial output value in the Block Start method. Hence it sets a flag to indicate that the IC value needs to be loaded, and postpones the state initialization to the Block Outputs method in the simulation loop. This partition guarantees the state to be initialized with the correct value, but is not optimal. Exemplary code for conventional approach is provided as follows.

| | |
|---|---|
| Block Start method | ``void MdlStart(void)``<br>``{``<br>`` rtB_SRC = sysfunction( . . . );``<br>``}`` |
| Block Initialize method | ``void MdlInitialize(void)``<br>``{``<br>`` rtDWork.Disc_Time_Integr_IC_LOADING = true;``<br>``}`` |

-continued

| Block Outputs method | ```
void MdlOutputs(int_T tid)
{
    /* Compute output of SRC block */
    rtB_SRC = sys_function( ... );
    /*
     * If IC has not been loaded, get the output value of SRC block
     * and load it into Discrete Integrator block's DSTATE as the
     * IC. Also reset the IC_LOADING flag to false so that loading IC
     * happens only the first time MdlOutput is called.
     */
    if ( rtDWork.Disc_Time_Integr_IC_LOADING) {
        rtDWork.Disc_Time_Integr_DSTATE = rtB_SRC;
        rtDWork.Disc_Time_Integr_IC_LOADING = false;
    }
    /* Compute output of Discrete Integrator block */
    rtB_Disc_Time_Integr = rtDWork.Disc_Time_Integr_DSTATE;
    /* Compute output of Sine Wave block */
    rtB.Sine_Wave = sine_wave_function( ... );
    rtY.Out1 = rtB_Disc_Time_Integr;
}
``` |
|---|---|
| Block Update method | ```
void MdlUpdate(int_T tid)
{
    rtDWork.Disc_Time_Integr_DSTATE =
        rtDWork.Disc_Time_Integr_DSTATE+ rtB.Sine_Wave;
}
``` |

Less Efficient Simulation

The conventional initialization mechanism requires an extra Boolean flag and an extra if-condition to determine whether it needs to read in the IC port value of the Integrator block and use this value to initialize state of the Integrator block at every simulation step, as shown above in the exemplary code for the conventional approach. In the conventional simulation loop, the Block Outputs method of the block that is feeding the IC port is called at every simulation step, although the input signal of the IC port is needed only when the Integrator block initializes its state.

Less Efficient Code Generation

Furthermore, the conventional initialization mechanism deteriorates the readability of generated code for the Block Outputs method because of the extra code introduced for external IC handling. This problem extends to the accelerator mode simulation that uses the generated code to execute or simulate the block diagram.

SUMMARY OF THE INVENTION

The present invention provides graphical programming or modeling environments, such as a block diagram environment, in which graphical programs or models are configured using handshaking communications between entities of the graphical programs or models. The present invention provides mechanisms for the handshaking configuration of graphical programs/models before the graphical models enter a simulation or execution loop in the graphical programming/modeling environments.

In the handshaking configuration mechanism of the present invention, the entities of the graphical models require information from other entities in order to configure the entities of the graphical models. The entities of the graphical models perform handshaking communications with other entities to receive the information for configuring the entities of the graphical models. The handshaking configuration mechanisms of the present invention enable the graphical models to be configured adaptively and to avoid unnecessary configuration.

The present invention may utilize execution contexts (ECs) to configure the entities of the graphical models. The ECs are a data structure associated with the entities and subsystems of the entities which provides fine-grained control over the execution of the associated elements based on the satisfaction of a pre-condition. By utilizing the ECs, the present invention enables the entities of the graphical models to be configured prior to entering the simulation or execution loop of the graphical models. The present invention therefore removes configuration-related processes from the simulation or execution loop of the graphical models and provides an efficient simulation and code generation of the graphical models. The handshaking configuration mechanisms of the present invention may apply to the configuration of attributes of the entities and/or the initialization of the entities of the graphical programs/models.

In accordance with one aspect of the present invention, a method is provided for configuring a model in a modeling environment. The method includes the step of enabling the first component of the model to communicate with a portion of the model to determine whether the portion of the model is able to provide the first component with information for configuring the first component. The portion of the model includes one or more entities of the model. The method also includes the step of configuring the first component based on the communications between the first component of the model and the portion of the model.

In another aspect of the invention, a method is provided for configuring a model in a modeling environment. The method includes the step of setting up an execution context from the input port of a first component in the model. The method also includes the step of enabling the execution context to communicate with a portion of the model to determine whether the portion of the model is able to provide information for configuring the first component of the model. The portion of the model includes one or more entities of the model.

In another aspect of the invention, a system is provided for configuring a model in a modeling environment. The system includes a model processing engine for enabling a first component of the model to communicate with a portion of the model and configuring the first component based on a communication between the first component of the model and the portion of the model. The portion of the model includes one or more entities of the model. The system also includes an execution engine for executing the model configured by the model processing engine.

In another aspect of the invention, a medium is provided for holding instructions executed in a computer to configure a model in a modeling environment. The instructions are executed to enable the first component of the model to communicate with a portion of the model to determine whether the portion of the model is able to provide the first component with information for configuring the first component. The portion of the model includes one or more entities of the model. The instructions are also executed to configure the first component based on the communication between the first component of the model and the portion of the model.

In another aspect of the invention, a medium is provided for holding instructions executed in a computer to configure a model in a modeling environment. The instructions are executed to set up an execution context from the input port of a first component in the model. The instructions are also executed to enable the execution context to communicate with a portion of the model to determine whether the portion of the model is able to provide information for configuring the first component of the model. The portion of the model includes one or more entities of the model.

BRIEF DESCRIPTION OF THE DRAWINGS

The aforementioned features and advantages, and other features and aspects of the present invention, will become better understood with regard to the following description and accompanying drawings, wherein:

FIG. 6B depicts a linear sorted list generated from the directed graph of FIG. 6A;

DETAILED DESCRIPTION

Figure 1:
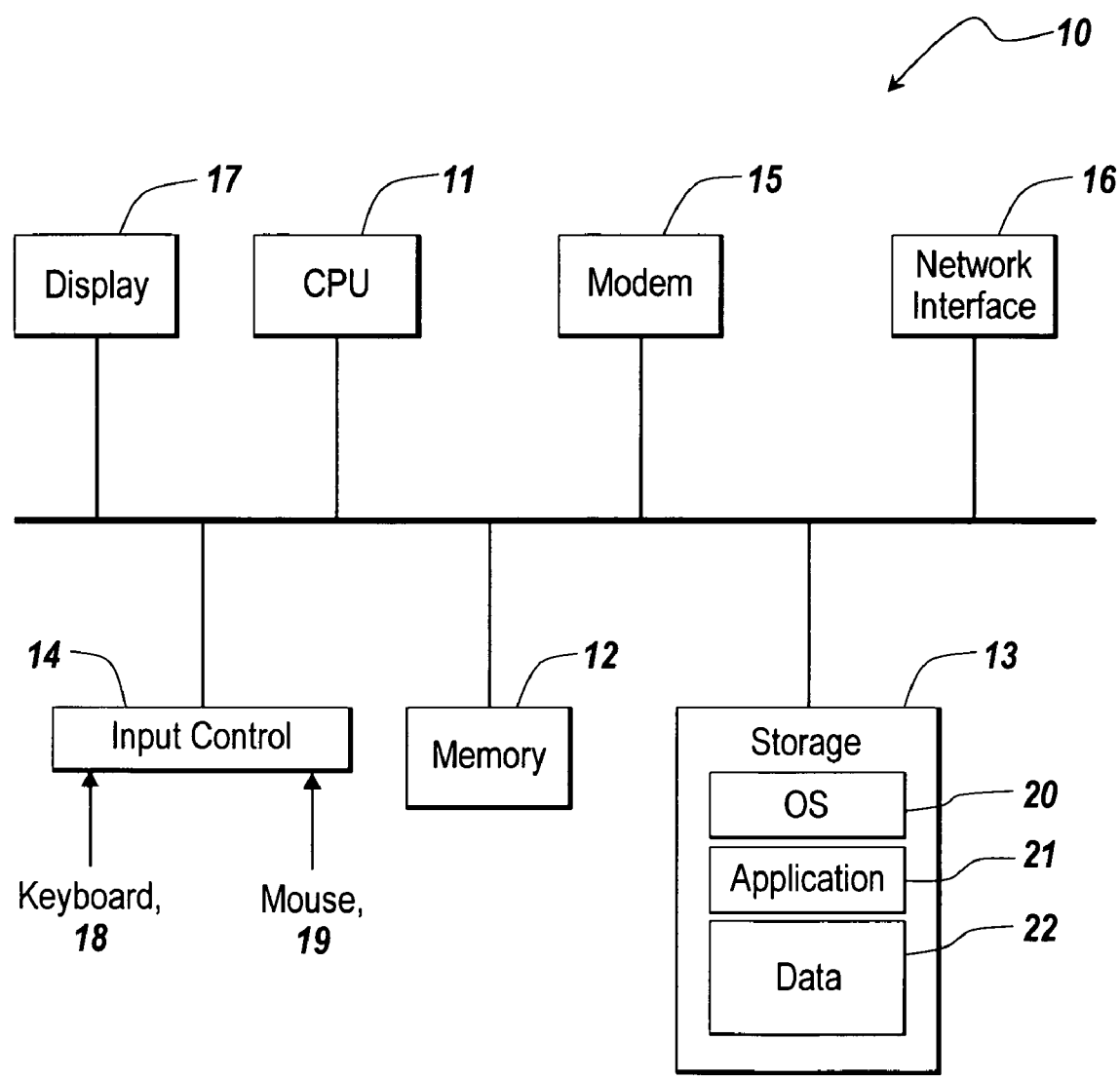
FIG. 1 shows an exemplary computing device suitable for practicing the illustrative embodiment of the present invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides a graphical programming or modeling environment in which a graphical program or model is simulated/executed or code is generated for the model. The terms "program/programming" and "model/modeling" will be used interchangeably in the description of the illustrative embodiment. In the description of the illustrative embodiment, the simulation of the graphical program/model is also referred to as the execution of the program/model.

The illustrative embodiment will be described below solely for illustrative purposes relative to a time-based block diagram environment. Although the illustrative embodiment will be described relative to the time-based block diagram environment, one of skill in the art will appreciate that the present invention may apply to other graphical programming/modeling environments, including state-based and flow diagram environments, data flow diagram environments, event-based, circuits, physics modeling, and Unified Modeling Language (UML) environments, as long as the graphical model has some notion of semantics that allows it to be transformed into an executable for a computer processor/microcontroller or directly synthesized in application-specific hardware.

The illustrative embodiment will be described below relative to a Simulink® model, a time-based block diagram found in Simulink® from The MathWorks, Inc. of Natick, Mass. Nevertheless, those of skill in the art will appreciate that the present invention may be practiced relative to models implemented in other graphical modeling environments, including but not limited to LabVIEW from National Instruments Corporation of Austin, Tex., and Rational Rose from IBM of White Plains, N.Y.

The illustrative embodiment of the present invention provides a block diagram environment in which a block diagram is initialized for execution using handshaking communications between blocks in the block diagram environment. The illustrative embodiment provides handshaking communication mechanisms for the initialization of the blocks in the block diagram before the block diagram enters a simulation or execution loop to execute the block diagram. In the initialization mechanism of the illustrative embodiment, the blocks may require information from other blocks to initialize the blocks. The blocks perform handshaking communications with other blocks to receive information for the initialization of the blocks. The handshaking configuration mechanisms enable the block diagram to be configured adaptively and to avoid unnecessary configuration.

The initialization mechanism of the illustrative embodiment may utilize execution contexts to initialize the blocks in the block diagram. The execution context is a data structure associated with blocks and subsystems of the blocks which provides fine-grained control over the execution of the associated elements based on the satisfaction of a pre-condition. By utilizing the execution context, the illustrative embodiment of the present invention enables the blocks to be initialized prior to the simulation or execution loop of the block diagram. The illustrative embodiment therefore removes initialization-related processes from the simulation or execution loop of the block diagram and provides an efficient simulation and code generation of the block diagram. One of skill in the art will appreciate that the initialization of the blocks for the execution of the block diagram is an illustrative embodiment and the handshaking communication mechanisms of the present invention can apply to other configuration mechanisms, such as the configuration of the attributes of the blocks, that requires information from other blocks.

FIG. 1 is an exemplary computing device 10 suitable for practicing the illustrative embodiment of the present invention, which provides a block diagram environment. One of ordinary skill in the art will appreciate that the computing device 10 is intended to be illustrative and not limiting of the present invention. The computing device 10 may take many forms, including but not limited to a workstation, server, network computer, quantum computer, optical computer, bio computer, Internet appliance, mobile device, a pager, a tablet computer, and the like.

The computing device 10 may be electronic and include a Central Processing Unit (CPU) 11, memory 12, storage 13, an input control 14, a modem 15, a network interface 16, a display 17, etc. The CPU 11 controls each component of the computing device 10 to provide the block diagram environment. The memory 12 temporarily stores instructions and data and provides them to the CPU 11 so that the CPU 11 operates the computing device 10 and runs the block diagram environment. The storage 13 usually contains software tools for applications. The storage 13 includes, in particular, code 20 for the operating system (OS) of the device 10, code 21 for applications running on the operation system including applications for providing the block diagram environment, and data 22 for block diagrams created in the block diagram environment. Those of ordinary skill in the art will appreciate that the application can be stored in the memory 12 as well, much like the data, and even the OS, or they can be stored on the network described below with reference to FIG. 2.

The input control 14 may interface with a keyboard 18, a mouse 19, and other input devices. The computing device 10 may receive through the input control 14 input data necessary for creating block diagrams, such as the selection of the attributes and operations of component blocks in the block diagrams. The computing device 10 may also receive through the input control 14 input data necessary for controlling the execution of the block diagrams. The computing device 10 may display in the display 17 user interfaces for the users to create or edit the block diagrams.

Figure 2:
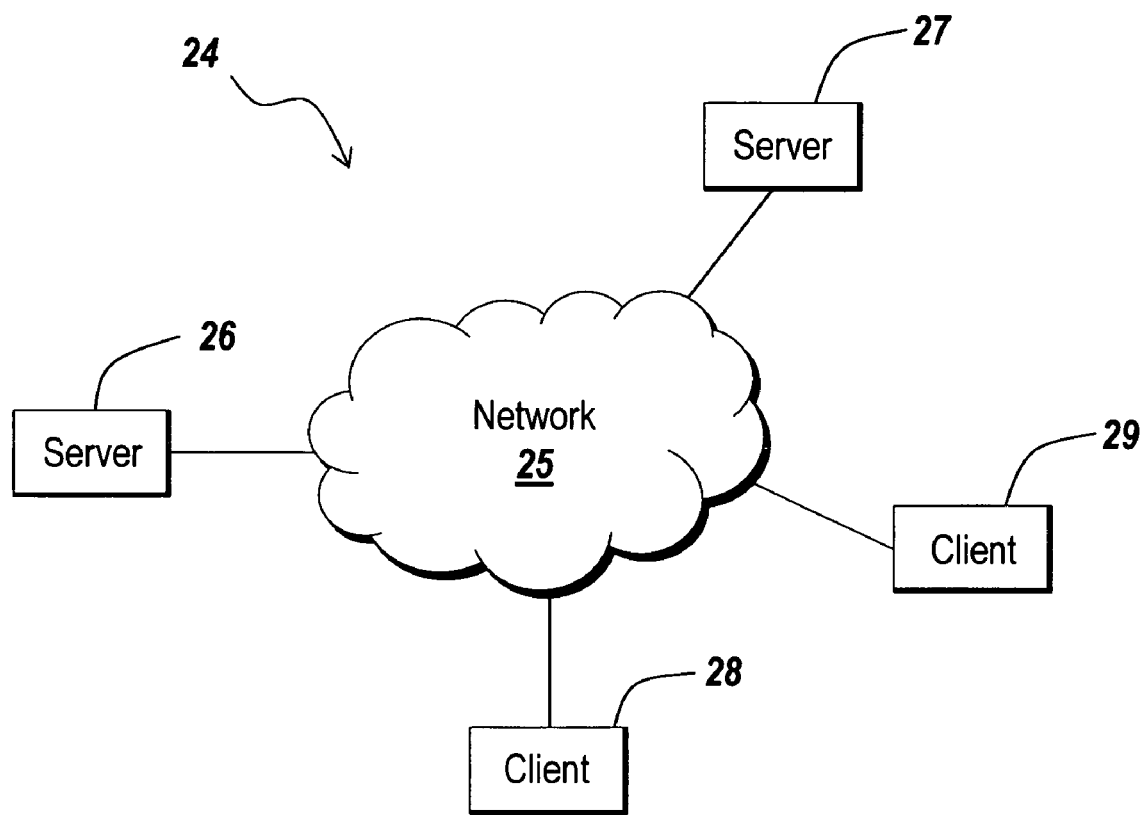
FIG. 2 shows an exemplary network environment suitable for practicing the illustrative embodiment of the present invention.

FIG. 2 is an exemplary network environment 24 suitable for the distributed implementation of the illustrative embodiment. The network environment 24 may include one or more servers 26 and 27 coupled to clients 28 and 29 via a communication network 25. The servers 26 and 27 and clients 28 and 29 can be implemented using the computing device 10 depicted in FIG. 1. The network interface 16 and the modem 15 of the computing device 10 enable the servers 26 and 27 to communicate with the clients 28 and 29 through the communication network 25. The communication network 25 may include Internet, intranet, LAN (Local Area Network), WAN (Wide Area Network), MAN (Metropolitan Area Network), etc. The communication facilities can support the distributed implementations of the present invention.

In the network environment 24, the servers 26 and 27 may provide the clients 28 and 29 with software components or products under a particular condition, such as a license agreement. The software components or products may include those for providing a block diagram environment and a block diagram created in the block diagram environment.

Figure 3:
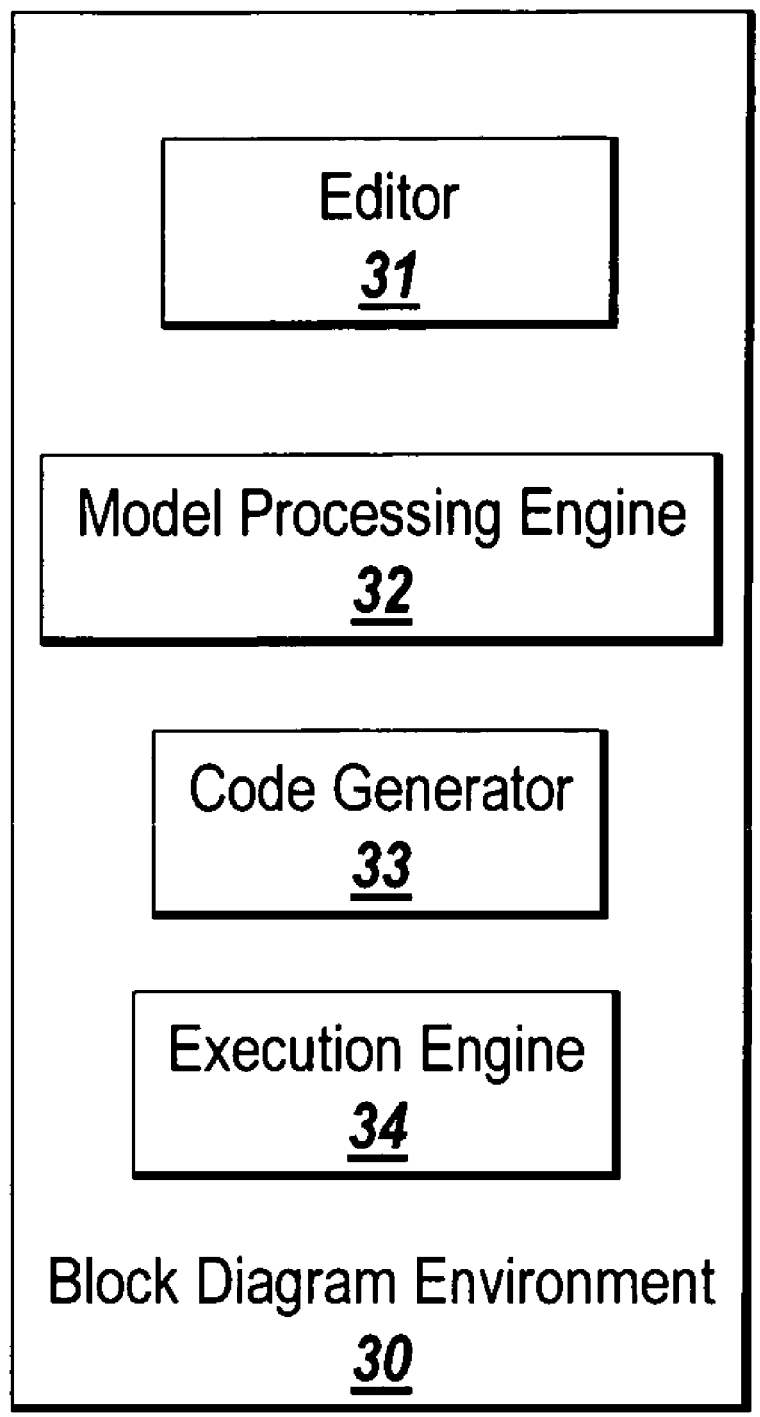
FIG. 3 depicts an exemplary block diagram environment provided in the illustrative embodiment of the present invention.

FIG. 3 depicts an exemplary block diagram environment 30 provided in the illustrative embodiment. The block diagram environment 30 may include an editor 31, a model processing engine 32, a code generator 33, and a model execution engine 34. An exemplary block diagram environment 30 can be provided by the software products, such as Simulink® from The Mathworks, Inc. of Natick, Mass., that cater to various aspects of dynamic system analysis and design. Such products allow users to perform various types of tasks including constructing system models through a user-interface that allows drafting block diagram models, allowing augmentation of a pre-defined set of blocks with custom user-specified blocks, the use of the block diagram model to compute and trace the temporal evolution of the dynamic system's outputs ("executing" the block diagram), and automatically producing either deployable software systems or descriptions of hardware systems that mimic the behavior of either the entire model or portions of it (referred to herein as "code generation"). Each of the tasks listed above has many intricate details and subtle variations which are explored further below. Although the discussion contained herein focuses on Simulink® from the MathWorks, Inc. of, Natick Mass., those skilled in the art will recognize that it is applicable to other block modeling software applications.

The block diagram editor 31 allows users to perform such actions as draw, edit, annotate, save, and print out block diagram representations of dynamic systems. As noted earlier, blocks are the fundamental mathematical elements of a classic block diagram model. Simulink® extends the classic block diagram models by introducing the notion of two classes of blocks, non-virtual blocks and virtual blocks. Non-virtual blocks are elementary dynamic systems. A virtual block is provided for graphical organizational convenience and plays no role in the definition of the system of equations described by the block diagram model. Examples of virtual blocks are the Bus Creator virtual block and Bus Selector virtual block which are used to reduce block diagram clutter by managing groups of signals as a "bundle". Virtual blocks may be used to improve the readability of models. Simulink® further extends the meaning of a non-virtual block to include other semantics, such as a "merge" block semantic. The merge block semantic is such that on a given time step its output is equal to the last block to write to an input of the merge block. An additional extension provided by Simulink® is the concept of conditional execution. Simulink® contains the concept of conditional and iterative subsystems that control when in time block methods execute for a sub-section of the overall block diagram.

A processing engine 32 carries out the task of compiling the block diagram to produce an "in-memory executable" version of the model that is used for generating code and/or simulating or linearizing a block diagram model. Note that execution of the block-diagram is also referred to as simulation. The compile stage involves checking the integrity and validity of the block interconnections in the block diagram. In this stage, the engine 32 also sorts the blocks in the block diagram into hierarchical lists that are used when creating the block method execution lists. In the link stage, the processing engine 32 uses the result of the compiled stage to allocate memory needed for the execution of the various components of the block diagram. The linking stage also produces block method execution lists that are used by the simulation or linearization of the block diagram. Included within the link stage is the initialization of the model which consists of evaluating "setup" methods (e.g. Block Start, Block Initialize, Enable, and ConstantOutput methods). The initialization of the model is described below in more detail with reference to FIGS. 15-25. The block method execution lists are generated because the simulation and/or linearization of a model must execute block methods by type (not by block) when they have a sample hit.

For linearization, Simulink® uses the block method execution lists in a prescribed fashion to produce a linear state space representation of the dynamic system described by the block diagram.

After linking has been performed, the code generator 33 may generate code. In this stage, the code generator 33 may choose to translate the block diagram model (or portions of it) into either software modules or hardware descriptions (broadly termed code). If this stage is performed, then the stages that follow use the generated code during the execution of the block diagram. If this stage is skipped completely, then the execution engine 34 uses an interpretive mode of execution for the block diagram. In some cases, the user may not proceed further with the execution of the block diagram because they would like to deploy the code outside the confines of the block diagram software. Upon reaching the simulation stage, the execution engine 34 uses a simulation loop to execute block methods in a pre-defined ordering upon a sample hit to produce the system responses as they change with time.

Figure 4:
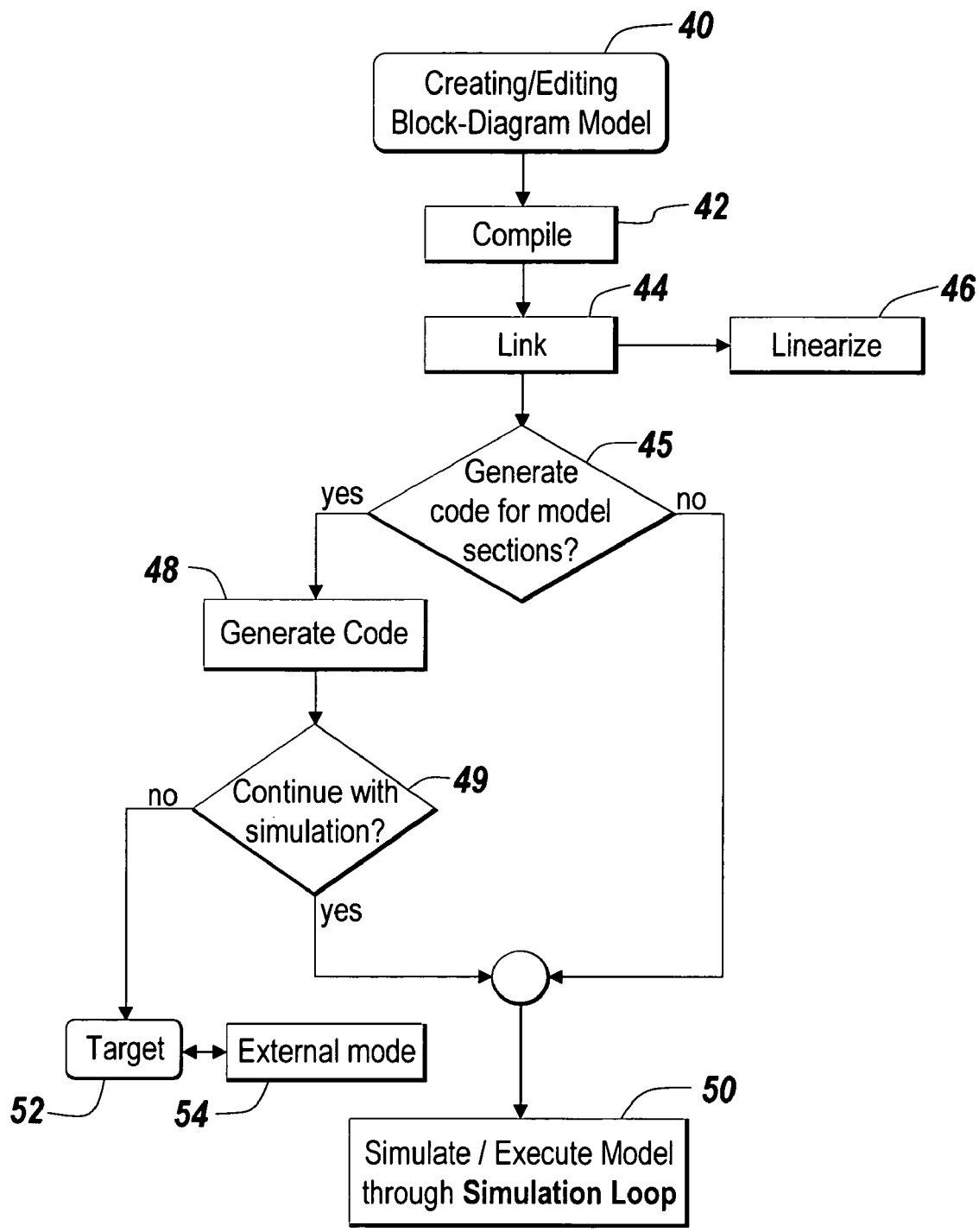
FIG. 4 is a flow chart of the sequence of steps used to perform simulation of the block diagram.

The interrelationship between the various stages is illustrated in a flowchart in FIG. 4. The execution begins when the block diagram is created/edited (step 40) and compiled (step 42). Following the compilation stage, is the model link stage (step 44) which may also produce linear models (step 46). Code may or may not be generated (step 45). If code is generated (step 48), a decision is made (step 49) whether to continue the simulation. If the decision is made to continue the simulation the model is simulated/executed through the Simulation Loop (step 50). If the simulation is not continued, the code may be delivered to a target (step 52) and executed in an external mode (step 54). If code is not generated the block diagram may execute in interpretive mode when entering the Simulation Loop (step 50).

The block diagram editor 31 is the graphical user interface (GUI) component that allows drafting of block diagram models by a user. In Simulink®, there is also a textual interface with a set of commands that allow interaction with the graphical editor 31. Using this textual interface, users may write special scripts that perform automatic editing operations on the block diagram. A user generally interacts with a set of windows that act as canvases for the model. There is generally more than one window for a model because models may be partitioned into multiple hierarchical levels through the use of subsystems (discussed further below).

A suite of GUI tools in Simulink® allows users to draft a block diagram model on the corresponding windows. The GUI tools include a block palette, wiring line connection tool, annotation tool, formatting tool, attribute editing tool, save/load tool and publishing tool. The block palette is a library of all the pre-defined blocks available to the user when they are building the block diagram. Individual users may be able to customize this palette to: (a) reorganize blocks in some custom format, (b) delete blocks they do not use, and (c) add custom blocks they have designed. The palette allows blocks to be dragged through some human-machine interface (such as a mouse or keyboard) from the palette on to the window (i.e., model canvas). The graphical version of the block that is rendered on the canvas is called the icon for the block. There may be different embodiments for the block palette including a tree-based browser view of all of the blocks.

The wiring line connection tool allows users to draw directed lines that connect the ports of blocks in the model's window. Lines are also added through various mechanisms involving human-machine interfaces such as the mouse or keyboard. Simulink® also provides various forms of auto-connection tools that connect blocks automatically on user request to produce an aesthetically pleasing layout of the block diagram (especially those with high complexity with large numbers of blocks). The annotation tool allows users to add notes and annotations to various parts of the palette for a block diagram. The formatting tool enables users to perform various formatting operations that are generally available on any document editing tool. These operations help pick and modify the various graphical attributes of the block diagram (and constituent blocks) such as include font-selection, alignment & justification, color selection, etc. The block diagram and all the blocks within the block diagram generally have a set of functional attributes that are relevant for the execution or code-generation. The attribute editing tool provides GUIs that allows these attributes to be specified and edited. The save/load tool allows a created block diagram model to be saved. The saved model can be reopened in the editor 31 at some later juncture through a load mechanism. Simulink® also allows users to save blocks including pre-constructed subsystems into a separate class of block-diagrams called libraries. Such libraries facilitate reuse of the same block in a number of other block-diagrams. The load/save mechanism is specially equipped to handle loading and saving of blocks in a block-diagram that actually reside in libraries.

The publishing tool enables the viewing of the block diagram as a document that can be published in any of the standard document formats (examples: PostScript, PDF, HTML, etc.). Those skilled in the art will recognize that the windows for multiple models and all of the tools mentioned above could potentially be embedded in a single Multi-Document Interface (MDI) for providing a unified software environment. Those skilled in the art will also recognize that block-diagram packages offer scripting languages for writing out programs that automatically carry out a series of operations that would normally require interaction with the GUI. For example, Simulink® offers a set of commands in MATLAB for carrying out operations such as block addition (add_block), block deletion (delete_block), starting and terminating execution (set_param), modifying block attributes (set_param/get_param), etc.

Simulink® also offers a variety of other GUI tools that improve the ability of users to build and manage large block diagrams. Examples of such GUIs include: (a) a Finder that helps find various objects such as blocks and lines within a block-diagram, (b) a Debugger that helps debug the execution of block-diagrams, (c) a Revision Control UI for managing multiple revisions of the block-diagram, and (d) a Profiler for viewing timing results while executing a block-diagram.

A typical base data-structure for a block may be represented as:

```
class Block {
  public:
  // Access methods for setting/getting block data
  ...
  // Methods for block editing
  virtual ErrorStatus BlockDrawIcon( );
  virtual BlockParameterData BlockGetParameterData( );
  ...
  // Methods for block compilation
  ...
  // Methods for block execution
  ..........................................
  virtual ErrorStatus BlockOutput( ) = 0;
  virtual ErrorStatus BlockDerivative( ) = 0;
  virtual ErrorStatus BlockUpdate( ) = 0;
  ...
  private:
  BlockGraphicalData blkGraphicalAttributes;
  BlockFunctionalData blkFunctionalAttributes;
  BlockCompiledData blkCompiledAttributes;
  BlockExecutionData blkExecutionData;
  ...
};
```

Although the example of the data structure above is written in C++, those skilled in the art will recognize that equivalent data structures written in other languages may also be used. The major data fields of the block data structure fall into four categories including a graphical attributes field, a functional attributes field, a compiled attributes field and an execution data field.

The graphical attributes field is responsible for storing information relevant for graphical rendering of the block within its parent block diagram's GUI. Attributes specific to the block icon such as font, color, name, and icon-image are stored in this field. It should be noted that modifying these attributes does not affect the dynamics of the model using this block. The functional attributes field is responsible for specifying block attributes that may potentially affect the dynamics of the model using this block. These attributes are specified for the block as a whole and the input and output ports of the block. Examples of block attributes include block sample times and restrictive flags. Block sample times specify if the block corresponds to an elemental, continuous, discrete, or hybrid dynamic system. If the block is an elemental discrete-time system, then the attribute specifies the spacing between time instants at which the block response should be traced. A restrictive flag disallows the use of blocks in certain modeling contexts. For example, one may impose the restriction that there may only be one instance of a given block in a model.

Attributes of block ports specify properties of the data that is either available or produced at that port. Block port attributes include dimensions, data types, complexity, sample rates, and direct feed through. Dimension attributes are individual dimensions of a multi-dimensional matrix that is used as a container for data elements. Data type attributes are the data type of each element of data in the data container. A complexity attribute is a flag to specify if each data element is real or complex. A sample rate attribute specifies when the signal corresponding to an input or output port will be used. The port sample times may sometimes be used to implicitly infer the block's sample time. The direct feed through attribute is specified only for input ports and indicates whether or not the Output and/or GetTimeOfNextHit equations of the block are a function of the given input. This attribute helps in determining the sequence in which block methods should be executed while executing the block diagram.

The compiled attributes field of the block data structure holds the attributes of the block and its ports that mirror the functional attributes listed above. This field is filled in during block diagram compilation by utilizing the functional attributes of the block in conjunction with the functional and compiled attributes of the blocks that are connected to it. This process of determining the compiled attributes from the functional attributes is termed attribute propagation. Attribute propagation is described in greater detail below in connection with block diagram compilation. The execution data field is mainly responsible for storing the memory locations that are going to serve as sources for block inputs, outputs, states, parameters, and other work areas during execution of blocks.

The block data structure also has a set of associated methods that may be categorized as access methods to data fields, methods used in editing, methods used in compilation and methods used in execution. Access methods to data fields help in setting and getting the various data fields of the block. Methods used in editing are called by the block diagram editor 31 in order to render the block appropriately in the GUI of its parent block diagram. For instance, this set of methods may include a BlockDrawIcon method that determines the shape the block icon has on the GUI. Methods used in compilation are methods that are called by the block diagram compilation engine. They help validate the connections of the block to other blocks on the block diagram. The methods used in execution include a number of different run-time methods that are required for execution. These include the BlockOutput, BlockUpdate, BlockDerivative methods that realize the Output, Update, and Derivative equations discussed earlier in the context of dynamic systems. In addition to these methods, Simulink® includes several other run-time methods, such as the Jacobian, Projection, ZeroCrossings, Enable, Disable, Initialize, EvalParams (check and process parameters), and GetTimeOfNextHit methods. The Initialize method is called when a block is reset, e.g. a block is inside an enabled system configured to reset states and this function is called when the subsystem becomes enabled. The initialization of the block diagram is described below in more detail with reference to FIGS. 15-25. It should be noted that there is no explicit method for algebraic equations because these are represented and processed in a different manner which will be discussed below.

The base data structure for the block specifies the generic fields and interfaces that need to be supported by a block. Some of the methods are purely virtual and have no specific implementation in the base block class. In order to define a specific block (such as an Integrator block), one needs to subclass the base block class and provide explicit definitions for these virtual methods. An example of the subclassing of a block may be seen by examining an Integrator block. In order to create the subclass, four major categories of information within the subclass must be specified, the block parameters, the methods used in editing, the methods used in compilation, and the methods used in execution. The elemental dynamic system embodied by the block may be parameterized as illustrated in the Background of the Invention. Each block needs to be able to specify its list of expected parameters. The block diagram editor's Attribute-Editing tool may allow users to specify the parameters for the block when they use it in their models. In the Integrator block example, the block has one parameter that specifies the block's initial condition for the block's state. Regarding the methods used in editing, the subclass needs to specify a method that renders its icon. For example, the Integrator block may implement a method that makes its icon be a box with a '1/s' within the box. Also, the subclass needs to instantiate a method that allows access of the block parameters from the GUI's Attribute-Editing tool. For the Integrator example, this method would allow users to specify the Initial Condition parameter on a GUI for the block. For the methods used in compilation, the subclass needs to instantiate methods that help in the compilation of the block diagram model in which it is placed. These methods help specify the compiled information for the inputs and outputs of the block. For instance, the Integrator block may specify a method that ensures that if the input to the Integrator is a vector, then the output is a vector of the same size. For methods used in execution, the subclass needs to instantiate specific Output, Derivative, and Update methods that represent the block behavior. In the case of the Integrator block, an Output and Derivative method are needed. It should be noted that in Simulink® the Integrator block has additional parameters and methods that are not illustrated here. The Output method sets the output to be equal to the state. The Derivative method sets the derivative of the state to be equal to the input.

The specification of these four types of information for the Integrator block subclass may be shown by a reduced form of the Simulink® Integrator block:

```
IntegratorBlock : public Block {
public:
  ErrorStatus BlockDrawIcon( ) {
  // Draw '1/s' on the icon
  ..........................
  }
  BlockParameterData BlockGetParameterData( ) {
  // Return initial_condition as block data
  ..........................
  }
  ErrorStatus BlockOutput( ) {
  // Implement y(t) = x(t)
  ..........................
  }
  ErrorStatus BlockDerivative( ){
  // Implement dx(t)/dt = u(t)
  ..........................
  }
private:
  double initial_condition;
};
```

It should be noted that block diagram software generally provides open access to the block's data structure to users of the software. This allows users to create and utilize custom block implementations in their models.

Blocks in a block diagram may be virtual or non-virtual. The designation of a block as non-virtual indicates that it influence the equations in the mathematical model for the dynamic system. In the context of block diagram software, it is beneficial to include other virtual blocks that do not affect the equations in the dynamic system's model. Such blocks help improve the readability and modularity of the block diagram and wield no semantic influence on the mathematical model. Examples of such virtual blocks include virtual subsystems, inport blocks and outport blocks, bus creator blocks, bus selector blocks and From and Goto blocks.

Modularity may be achieved in a block diagram by layering the block diagram through the use of subsystems. A subsystem facilitates layering by allowing a collection of blocks to be represented by a single block, the subsystem, with input and output signals. The input and output signals of the subsystem are accessible to the constituent blocks within the subsystem. A subsystem is a virtual subsystem if its constituent blocks are moved back into the main block diagram model during the model's execution. Within a virtual subsystem graphical entities, called inport and outport blocks, are provided to define signal connections to the parent block diagram. These inport and outport blocks indicate a tunnel-through signal connection to the parent block diagram.

Simulink® also provides the user with the ability to extend the simulator by providing the ability to enhance the simulator with blocks that define dynamic systems or are virtual properties. The extension is provided through a language independent API (e.g. C, C++, Ada, Fortran, Assembly, M).

As noted previously, to facilitate modeling fairly large and complex dynamic systems, Simulink® allows users to layer their block diagrams. A subsystem facilitates such layering by allowing a collection of blocks to be represented by a single block, a subsystem, with input and output signals. The input and output signals of the subsystem are accessible to its constituent blocks. By nesting subsystems within each other, one can create block diagrams with arbitrary layers of hierarchy. Ideally a subsystem has no impact on the meaning of the block diagram. Additionally, subsystems provide a way of grouping blocks together and allowing other block diagram constructs to impose unified control on the constituent blocks. To enhance the modularity of subsystems, modeling software also allows aggregated list(s) of parameters of the blocks within the subsystem to be accessed from a single GUI, and defines and displays special icons on the subsystems. The process of defining the parameter list and the special icon is called masking a subsystem.

There are two main types of subsystem blocks, virtual subsystems and non-virtual subsystems. Virtual subsystems serve the purpose of providing the block diagram with a graphical hierarchy. Non-virtual subsystems behave like an elemental dynamic system with its own execution methods (Output, Update, Derivatives, etc.). These execution methods in turn call the execution methods of the constituent blocks.

The classes of non-virtual subsystems are:

Atomic subsystems. These are similar to virtual subsystems, with the advantage of grouping functional aspects of models at a given layer. This is useful in modular design.

Conditionally-executed subsystems. These are non-virtual subsystems that execute only when a precondition is fulfilled:

Enabled subsystems. These are similar to Atomic subsystems, except that the constituent blocks only execute when an enable signal feeding the subsystem is greater than zero.

Triggered subsystems. These are similar to Atomic subsystems, except that the constituent blocks only execute when a rising and/or falling signal is seen on a triggering signal feeding the subsystem.

Enable with Trigger subsystems. These are an intersection of the properties of Enabled and Triggered subsystems.

Action subsystems. These subsystems are connected to an action-initiator (e.g., an "If" or "SwitchCase" block), a block that explicitly commands the subsystem contents to execute. These subsystems are similar to Enabled subsystems except that the management of the "enabling" signal has been delegated to an action-initiator. Action subsystems define a new type of signal, called an action signal that signifies which subsystems are commanded to execute by the action-initiator.

Function-call subsystems. These subsystems provide a means of collecting blocks into a subsystem that is only executed when called by an owner block. The owner block may compute input signals for the subsystem before calling the subsystem. Additionally, the owner may also read output signals from the subsystem after calling it. Function-call subsystems define a new type of execution control signal, called a function-call signal that contains no data. It is used to define the execution relationship between the owner block and the function-call subsystem. Function-call owners may also designate themselves as an "interrupt" source. In simulation, they simulate the effects of an interrupt and in code generation they can attach themselves to an (asynchronous) interrupt.

While subsystems and For subsystems. These subsystems may execute the constituent blocks multiple times on a given time step.

Simulink® allows for several forms of block parameters to be defined. There are two general categories of parameters: those parameters that can be modified during simulation and those that cannot be modified. An example of a parameter that may be modified during simulation is the multiplication factor of a Gain block if configured by the user to allow modification during execution. A parameter such as the multiplication factor specifies coefficients of the dynamic equation, in this case the multiplication factor of the gain function defined by the Gain block. An example of a parameter that can never be modified during simulation is the sample time of the Gain block. The parameters that can be modified during simulation are further broken down into other categories which include mapping the dialog parameter (e.g. the amplitude) to run-time parameters or converting the dialog parameter to an inlined (non-modifiable) parameter. Run-time parameters can further be mapped to mathematical expressions of tunable MATLAB variables or MATLAB parameter objects describing properties of the variables (called Simulink.Parameter). A global run-time parameter data structure is used within Simulink® to manage the block parameters during the execution of the model.

In addition to block parameters, there are model-wide parameters that are generally associated with the solver. These parameters include aspects such as the time span in which to perform a simulation and the type of solver. Simulink® gives the user the ability to adjust solver parameters during model execution. The adjustment of these solver parameters is performed at the start of a time step.

Once a block diagram model has been constructed using the editor 31, the model is solved in order to trace the system outputs as a function of time. The solution of the model, which may be referred to as model execution, is carried out from a user-specified input time for a set of user-specified inputs. Simulation proceeds in four major stages: compilation, link, code generation, and the simulation loop. Alternatively, a linear representation of the model can be obtained (linearization).

The compile stage marks the start of model execution and involves preparing data structures and evaluating parameters, configuring and propagating block characteristics, determining block connectivity, and performing block reduction and block insertion. The preparation of data structures and the evaluation of parameters creates and initializes basic data-structures needed in the compile stage. For each of the blocks, a method forces the block to evaluate all of its parameters. This method is called for all blocks in the block diagram. If there are any unresolved parameters, execution errors are thrown at this point.

During the configuration and propagation of block and port/signal characteristics, the compiled attributes (such as dimensions, data types, complexity, or sample time) of each block (and/or ports) are setup on the basis of the corresponding functional attributes and the attributes of blocks (and/or ports) that are connected to the given block through lines or based on model attributes such as the solver step size. The attribute setup is performed through a process during which block functional attributes "ripple through" the block diagram from one block to the next following signal connectivity. This process (referred to herein as "propagation"), serves two purposes. In the case of a block that has explicitly specified its block (or its ports') functional attributes, propagation helps ensure that the attributes of this block are compatible with the attributes of the blocks connected to it. If not, an error is issued. For instance, if an Integrator block is implemented to only accept numbers of double precision data type, then this block will error out if it is driven by a block that produces single precision data, unless the user has asked for an implicit data conversion. Secondly, in many cases blocks are implemented to be compatible with a wide range of attributes. Such blocks adapt their behavior in accordance with the attributes of the blocks connected to them. This is akin to the concept of polymorphism in object-oriented programming languages. For instance, a discrete-time Filter block could be implemented to accept any of the standard integer data types ranging from 8-bit to 128-bit. The exact implementation of the block is chosen on the basis of the specific block diagram in which this block finds itself. Included within this step are other aspects such as validating that all rate-transitions within the model yield deterministic results and that the appropriate rate transition blocks are being used.

Figure 5:
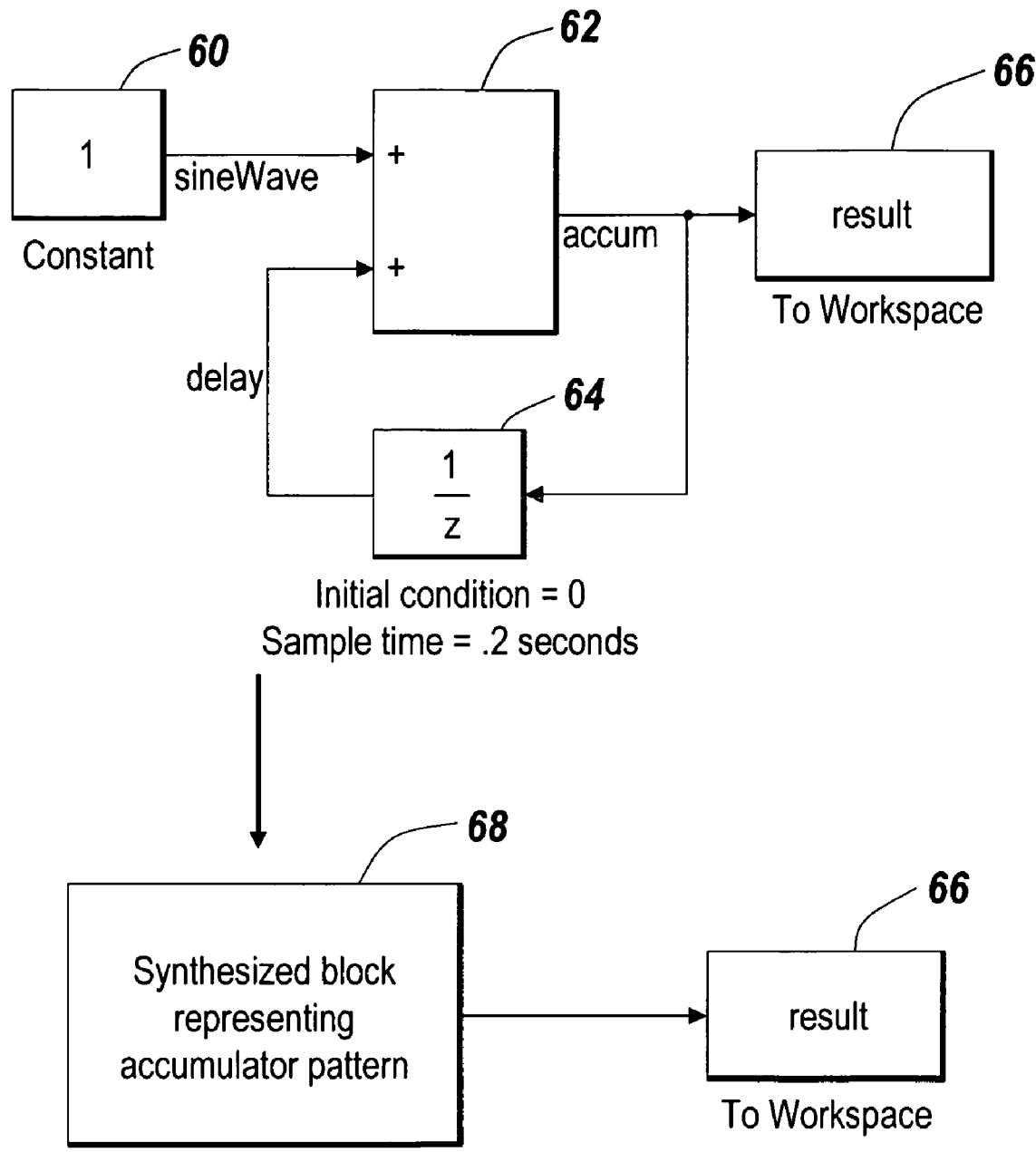
FIG. 5 depicts the replacement of a collection of blocks in a block diagram with an accumulator block.

The compilation step also determines actual block connectivity. Virtual blocks play no semantic role in the execution of a block diagram. In this step, the virtual blocks in the block diagram are optimized away (removed) and the remaining non-virtual blocks are reconnected to each other appropriately. This compiled version of the block diagram with actual block connections is used from this point forward in the execution process Once actual block connectivity has been determined (by removing the virtual blocks) the block diagram may be further optimized by performing block reduction and insertion. During this step, non-virtual blocks may be inserted or a set of non-virtual blocks may be completely removed or reduced to a single equivalent block. Block insertion and reduction is mainly done to improve execution efficiency. Examples of block insertion and reduction include the removal of Gain blocks whose gain value is 1. A Gain block is a block which multiplies its input value by a gain parameter, such as a simple amplifier. FIG. 5 depicts the replacement of a collection of blocks 60, 62, and 64 connected in an accumulator pattern and leading to result 66 with an equivalent synthesized block 68 representing the accumulator pattern leading to the same result 66. A signal copy block may also be automatically inserted in order to make contiguous memory copies of signals that are made up of disjoint memory sections. Block insertion and reduction may also be performed at other suitable stages of compilation.

The way in which blocks are interconnected in the block diagram does not necessarily define the order in which the equations (methods) corresponding to the individual blocks will be solved (executed). The actual order is partially determined during the sorting step in compilation. Once the compilation step has completed, the sorted order cannot be changed for the entire duration of the block diagram's execution.

The first step in sorting involves transforming the graphical block diagram into a compiled (in-memory) directed graph consisting of arcs and vertices. The vertices are derived from some of the non-virtual blocks. For instance, virtual and reduced blocks do not appear in the directed graph. The arcs represent data dependencies between the vertices. The data dependencies do not correspond to the signals in the block diagram. For example, all signals that connect to input ports without direct feed through are "cut" or ignored. In addition, data dependencies are added to capture implicit dependencies. For example, all inputs to a Function-Call subsystem are implicit data dependencies to the owner (caller) block.

Figure 6A:
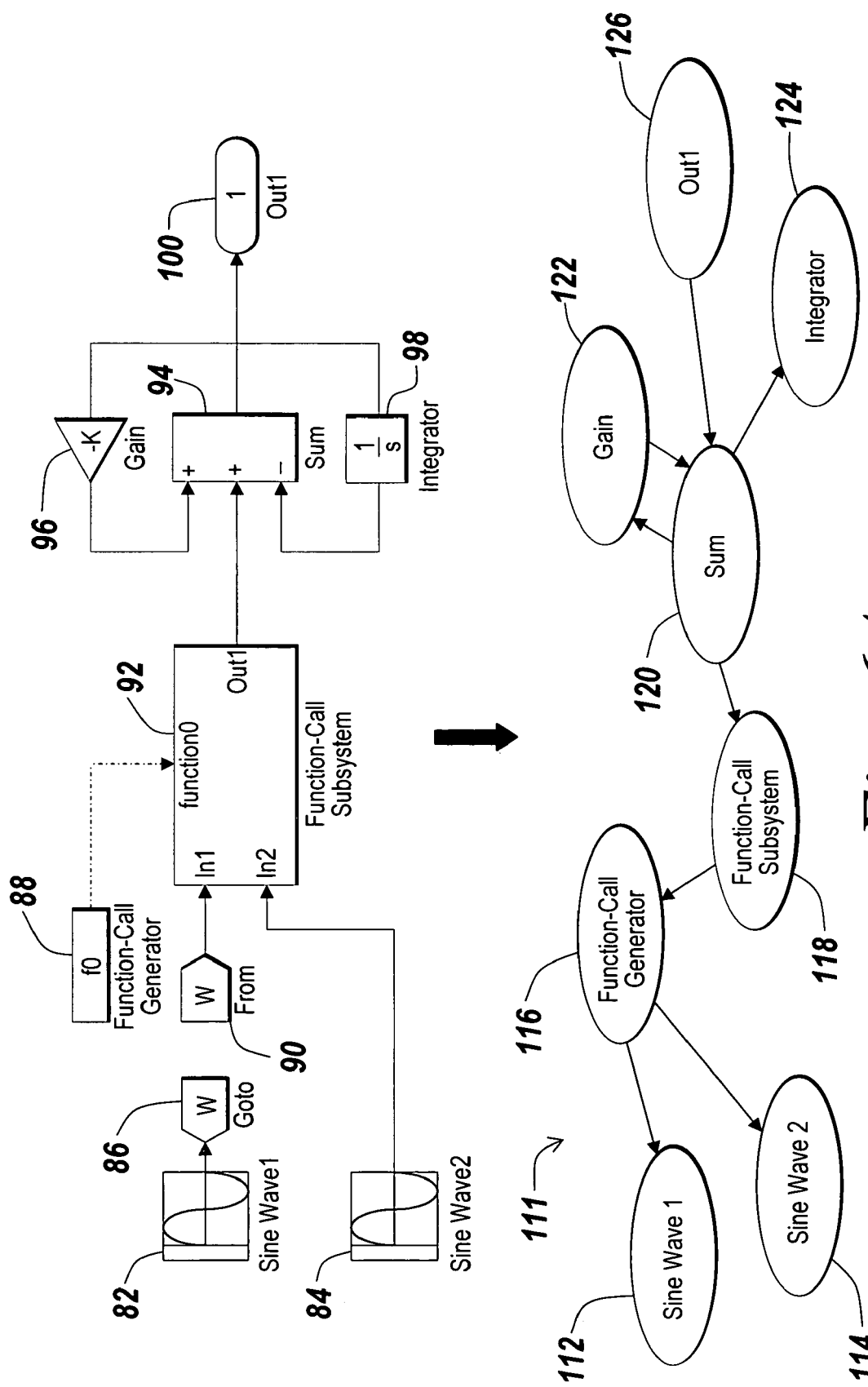
FIG. 6A depicts a block diagram and its associated directed graph.

The process of converting a block diagram into a compiled directed graph is shown in FIG. 6A. A block diagram includes a Sine Wave1 block 82, a Sine Wave2 block 84, a Goto block 86, a Function Call Generator block 88, and a From block 90. Also included are a Function Call Subsystem block 92, a Sum block 94, a Gain block 96, an Integrator block 98 and an Outport (Out1) block 100. Those blocks which are not virtual or reduced appear on the corresponding directed graph 111. The directed graph 111 includes a Sine Wave1 vertex 112, a Sine Wave2 vertex 114, a function-call generator vertex 116, and a function call subsystem vertex 118. Also included are a Sum vertex 120, a Gain vertex 122, an Integrator vertex 124 and an Out1 vertex 126. The vertices are connected by edges.

The graph is used to sort the blocks into a linear sorted list. FIG. 6B depicts a sorted list 128 generated from the compiled directed graph 111 which includes the elements appearing as vertices in the directed graph 111 sorted into order. The root block diagram has a sorted-list associated with it. Roughly speaking, each non-virtual subsystem layer and some special block diagram elements also each have their own sorted-list. During the sorting of the graph into the list, strongly connected components are identified. The term strongly connected component, which is a term that originates from graph theory, is a subset, S, of the blocks of a block diagram such that any block in S is reachable from any other block in S by following signal connections and S is not a subset of any larger such set. Strongly connected components are flagged as algebraic loops when all blocks have direct feed through (an example is shown in FIG. 6A consisting of the Sum 12 and Gain 122 blocks). Such loops correspond to a set of algebraic equations and are solved using iterations and perturbations during block diagram execution by solving for the algebraic variables. Algebraic variables are either specified by the user via Initial Condition blocks or chosen by the execution engine 34. Solving of algebraic loops is discussed further below.

Sorting must also take into consideration other user specified dependencies between the blocks. These dependencies include the concepts of priorities and placement groups. A block priority specifies the order in which the equations associated with a block are evaluated with respect to other blocks. Placement groups are a way of causing each class of block methods for a specified set of blocks to be "placed together" in the block method execution lists. The terms "data dependency" or "data precedence" as used herein refers to the edges of the compiled directed graph and not the signals found within a block diagram. Attempting to correlate data dependencies directly to the signals found within a block diagram is incorrect and leads to the conclusion that Simulink® does not satisfy data dependencies, i.e., the execution of the operations or block methods does not satisfy data dependencies if one interprets signal connectivity as specifying data dependencies.

After compilation, the link stage commences. During this stage physical memory allocations are made in order to prepare for execution. Buffers are allocated for block input and output data buffers, states, and work areas. Additionally, block method execution lists that are derived from the sorted list allow for execution of the block diagram. Each block method execution list is a list of block methods that are to be executed in a sequence when each method within the list has a sample hit. There is generally a set of block method execution lists associated with each layer of the block diagram that corresponds to a non-virtual subsystem. Non-virtual subsystems are either defined by the user or automatically synthesized during compilation to either efficiently execute the model or simplify the implementation of the semantics defined by Simulink®. In multi-tasking mode, the lists within each layer may be further partitioned when block diagrams have blocks with different sample rates. These lists are explained in greater detail below.

Those skilled in the art will recognize that while the block method execution lists are derived from the sorted list, they do not necessarily correspond one-to-one with the sorted lists. First, each block method execution lists contains only blocks that have such a block method of the given type (class) defined by the list. Second, block methods corresponding to components like the function-call subsystem do not appear on the block method execution lists because they are executed by an "owner" block.

Although included in the discussion of the compilation stage, it is not required that the time-based diagram perform the block sorting step during compilation. The sorting step is performed to achieve efficient execution. Ignoring efficiency, there is no semantic reason to perform the sorting step. Any random ordering of the block methods will work. In fact, any ordering of all block method execution lists except the Output block method execution list will result in the same level of efficiency. Randomly re-ordering the Output block method execution list will yield correct answers. If the Output block method list is randomly ordered, then the Simulation engine, when executing the Output block method execution list, continues sequencing through the Output block method execution list at each point in time until there are no changes.

Similarly included within the linking stage for the sake of simplicity, is the memory initialization of the model. The memory initialization of the model includes invoking block start, initialize, constant initialize, enable, and constant output methods. These are examples of some of the block methods that are used during model setup (prior to execution) to initialize the "state" of the system so that execution or linearization can commence.

The compiled and linked version of the block diagram may be directly utilized to execute the model over the desired time-span. This interpretive mode of execution is suitable for getting fine-grained signal traceability. It should be noted that the traceability associated with interpretive execution comes at the price of increased overhead in the form of additional execution-related data-structures and messaging in the engine. An alternative to the interpretive execution mode is to utilize the generated-code created by the Real-Time Workshop tool for Simulink® models. In this mode, the engine (upon the behest of the user) translates a selected portion of the block diagram (or the entire block diagram itself) into code. Such code could be in a number of possible forms. The code may be instructions in a high-level software language such as C, C++, Ada, etc., hardware descriptions of the block diagram portions in a language such as HDL, or custom code formats suitable for interpretation in some third-party software. Alternatively, the code may be instructions suitable for a hardware platform such as a microprocessor, microcontroller, or digital signal processor, etc., a platform independent assembly that can be re-targeted to other environments, or just-in-time code (instructions) that corresponds to sections of the block diagram for accelerated performance.

The execution of a portion of the block diagram represented in code may be performed in a number of different ways based on the specific code format. The portion of the block diagram may execute a compiled version of the code generated in a high-level language (accelerated or software-in-the-loop simulation), the execution may simulate code that corresponds to a hardware description on a hardware simulator, (co-simulation execution), the execution may involve calling out to third-party software to run code generated for such software (co-simulation execution), or the execution may call out directly to hardware that will run code that was generated and compiled for that hardware (processor-in-the-loop execution).

There are several different advantages to execution through code generation: Execution of generated code can be more efficient than interpretive execution because of fewer data-structures and lesser internal messaging in the engine, although the increased efficiency generally comes at the cost of decreased execution traceability. Simulation of hardware descriptions during execution can help identify and resolve bugs in the software stage of a design project. Such bugs prove much more expensive to track and fix once the system has been implemented in hardware. Additionally, block diagram modeling software can be integrated with other software environments that are suitable for modeling and simulating special classes of systems. Models can be tested directly in hardware thereby making prototyping of new systems fast and cost-effective. For instance, consider the design of a controller for an anti-lock braking system of a car. The dynamics of the braking system can be executed in the interpretive mode in the block diagram. The controller itself can be implemented on a hardware micro-controller to test the efficiency of the control laws implemented within. Note that for such target execution, it is normally necessary for the time span over which a model is executed by the software to match real-world time. In other words, the software must allow real-time execution of the block diagram model. Those skilled in the art will recognize that when users generate code, they may choose to not proceed further with the block diagram's execution. They may choose to take the code and deploy it outside of the confines of the modeling software environment. This is normally the last step in the design of dynamic systems in a block diagram software package.

There are several forms of target code execution known to those skilled in the art such as Rapid Prototyping, Embedded System Deployment, and Hardware-in-the-Loop which execute a model or portions of a model via the generated code on a Real-Time System target. One aspect of deploying (executing) the generated code on a target is the notion of "external mode." External mode refers to a system where Simulink® acts as a monitor and debugger of the generated code running in real-time on a target. In External Mode, users can change parameters and view signals via standard Simulink® elements. Another important aspect of the code generation technology is that it is very extensible. Provided with the Simulink® product family is the Target Language Compiler (TLC). This technology enables the creation of "active scripts" that control how the generated code is produced for a block diagram. Using TLC, one can tailor the generated code to suit their specific needs.

The execution of the block diagram uses a Simulation Loop (SimLoop) for solving for the block diagram's outputs for a specified set of inputs over a specified span of time ("Time" in reference to the Simulation Loop means the time-line corresponding to the tracing of the dynamic system's outputs, not real-world time unless otherwise noted). The term "SimLoop" applies to real-time systems where each iteration is tied to a physical periodic clock or other timer source. During this process, the block methods (equations) corresponding to the individual blocks are executed by type following their sorted order when they have a sample hit. The term "block execution" is loosely used to mean executing all block methods associated with the given block for a given time step, generally starting with the output method. Strictly speaking, blocks do not execute; the engine executes (evaluates) the appropriate block methods at the appropriate time points.

Although blocks may be associated with more than one sample time in a sufficiently complex dynamic system, the descriptions contained herein are confined to blocks with a single sample-time. Those skilled in the art will recognize that the descriptions may be extended to encompass blocks with multiple sample times.

Figure 7A:
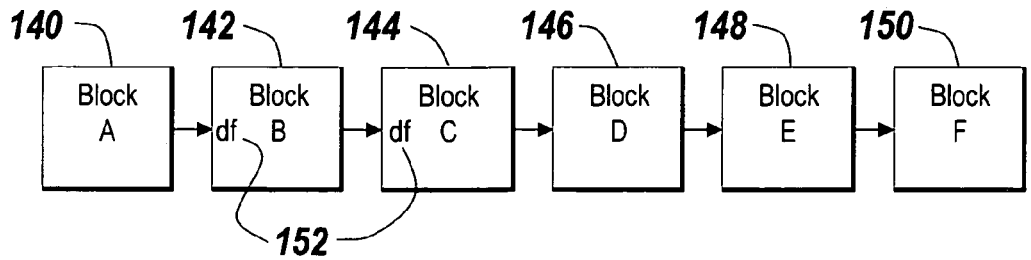
FIG. 7A depicts an abstract example of a block diagram being executed.
Figure 7B:
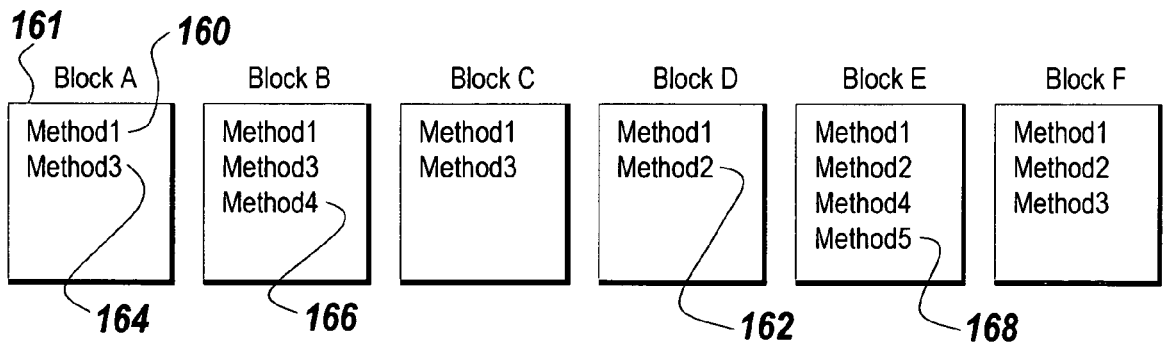
FIG. 7B depicts an abstract view of the execution methods instantiated by the blocks depicted in FIG. 7A.
Figure 7C:
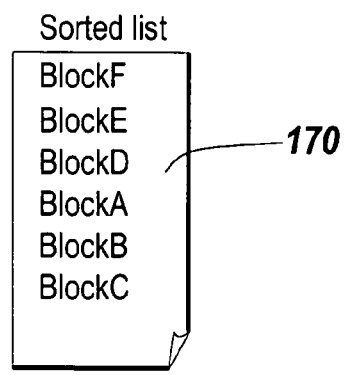
FIG. 7C depicts a sorted list generated from the data dependencies between blocks of FIG. 7A.

FIG. 7A depicts an abstract example of a block diagram being executed. The diagram includes a plurality of blocks 140, 142, 144, 146, 148 and 150. The block ports that have direct feedthrough are explicitly marked (using the symbol 'df') 152. Additionally, an abstract view of the execution methods instantiated by each block is shown in FIG. 7B. The blocks contain a number of different methods 160, 162, 164, 166 and 168. Execution methods include the three basic execution methods discussed earlier: Output, Update, Derivative, as well as several other methods that aid in advanced block functions such as initialization, linearization and zero-crossing detection, which are discussed below. The data-dependencies between the compiled vertices created during sorting are used to generate the Sorted List 170 shown in FIG. 7C.

Figure 8:
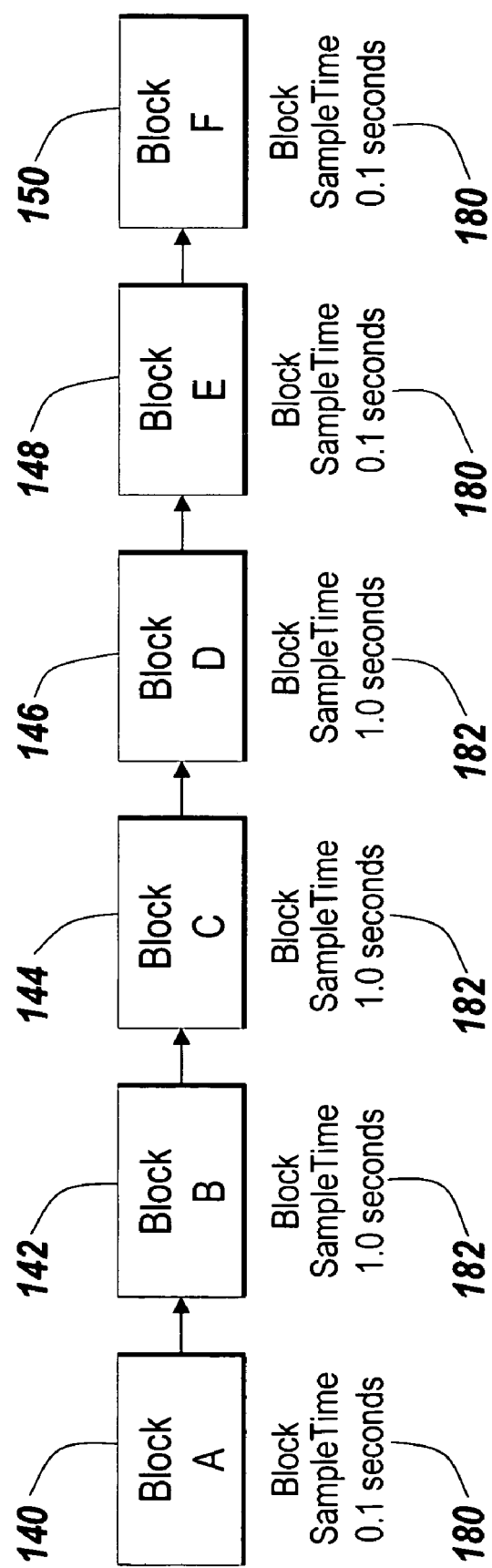
FIG. 8 depicts a multi-rate system.

A block diagram consisting of blocks that all have the same sample time is said to correspond to a single-rate system. A block diagram consisting of blocks that have more than one sample time corresponds to a multi-rate system. FIG. 8 depicts a multi-rate system, adding sample-time information to the block diagram of FIG. 7A. The plurality of blocks 140, 142, 144, 146, 148, and 150 each have an associated sample time. Since the sample times in the block diagram differ between blocks, the system is considered a multi-rate system. Block A 140, block E 148 and block F 150 each have a sample time of 0.1 seconds 180. Block B 142, block C 144 and block D 146 each have a sample time of 1.0 seconds 182.

The SimLoop is the heart of the execution engine 34. Each full pass through the loop is responsible for computing the outputs of the system at a particular time. At the end of each loop, the execution time corresponding to the next pass through the loop is computed. If this time exceeds the stop time specified by the user, the execution terminates. Within the loop, the sequence in which individual block equations are solved is determined by two pieces of information: the sample times of the blocks and the sorted order determined during the Compile stage. The amalgamation of these two pieces of information gives the execution lists for the block diagram. Those skilled in the art will recognize that the execution lists are created in the Link stage and are explained in the context of SimLoops for convenience. There are two distinct approaches for building execution lists and using them in the SimLoop. These approaches correspond to the Single-tasking and Multi-tasking Sim-Loops summarized in the discussion on FIG. 10 below.

Simulink® also has the ability to modify coefficients (parameters) of blocks that declare their parameters as tunable. An example of a block is a Sine Wave block that implements the function output (time)=Amplitude*sin (frequency*time+phase)+bias, where time is the independent variable and the parameters are: amplitude, frequency, phase, bias. When these parameters are declared as tunable, Simulink® lets the user change these coefficients during simulation. Changing parameters is a drastic operation in that the definition of the model has changed (e.g. the sine block defines equations that describe the system). Thus, to enable the changing of parameters during the SimLoop, Simulink® first queues parameter changes and then applies them on the next time step. Thus, the changing of parameters is not immediate. The delay in the changing of parameters is needed to ensure system stability. The application of the parameters at the start of the next time step is combined with the reset of the solver (Integrator) if needed.

Figure 9:
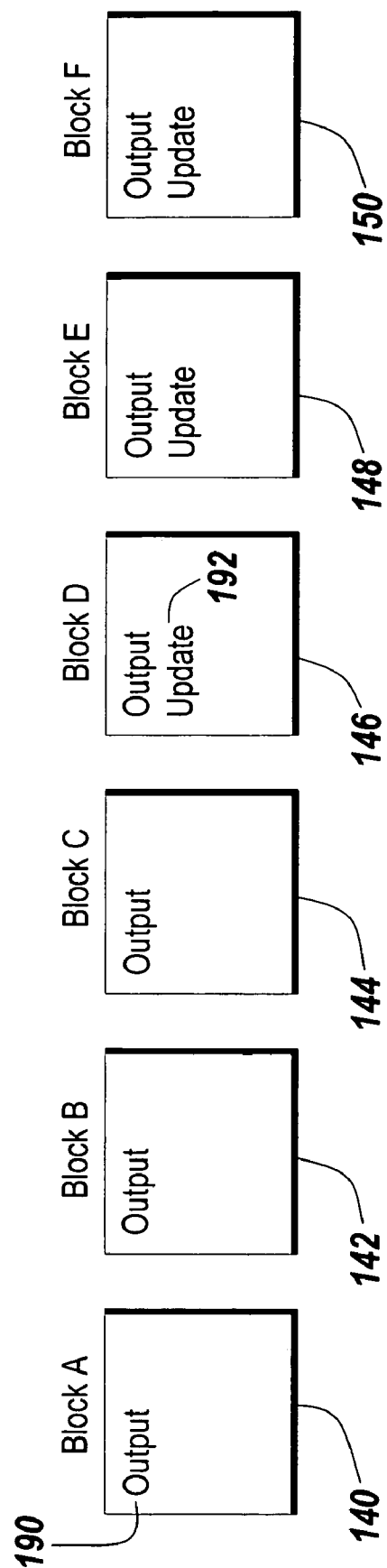
FIG. 9 depicts the block diagram of FIG. 7A and FIG. 8 with associated methods added to the blocks.

For the purpose of exploring single-task loops and multi-task loops, FIG. 9 depicts the block diagrams of FIG. 7A and FIG. 8 where Method1 corresponds to the Output method 190 and Method2 corresponds to the Update method 192. All other methods are ignored in the explanation of the loops. Simpler loops that do not include blocks that have continuous sample times are used in the example since the explanation is simpler in the context of discrete sample times and it is straight-forward to extend to continuous sample times.

Figure 10:
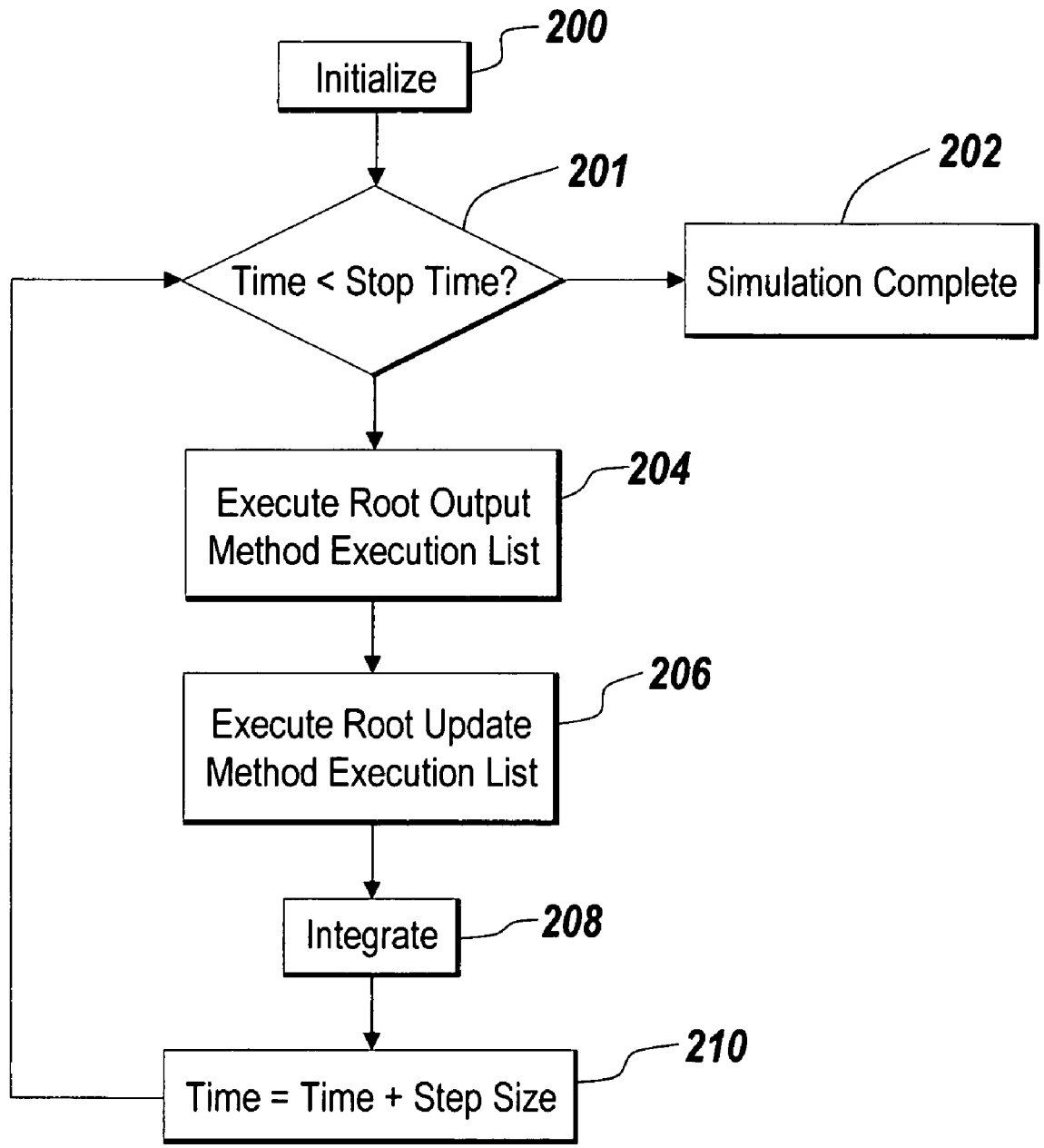
FIG. 10 is a flowchart of the sequence of steps followed by a single-tasking execution loop.

In a single-tasking SimLoop, there is essentially a single execution time-line. On this time-line, each block is executed when it has a sample hit. A sample hit is defined to be an execution time instant that is an integer multiple of the block's sample time. To aid in execution, execution lists are constructed for each method type. FIG. 10 depicts the sequence of steps followed by a single-tasking execution loop. The initialization of the model is described below in more detail with reference to FIGS. 15-25. Following initialization (step 200), a time parameter is checked to see if the current time is less than the stop time (step 201). If the time is not less than the stop time, the simulation ends (step 202). If the time is less than the stop time, the simulation continues and the root output method execution list is executed (step 204). Following execution of the output method list (step 204) the update method execution list is executed (step 206). Following the performance of an integrate step (208) (the Integrate step is described more below in FIG. 14), the time parameter is incremented by the applicable step size (step 210).

Figure 11A:
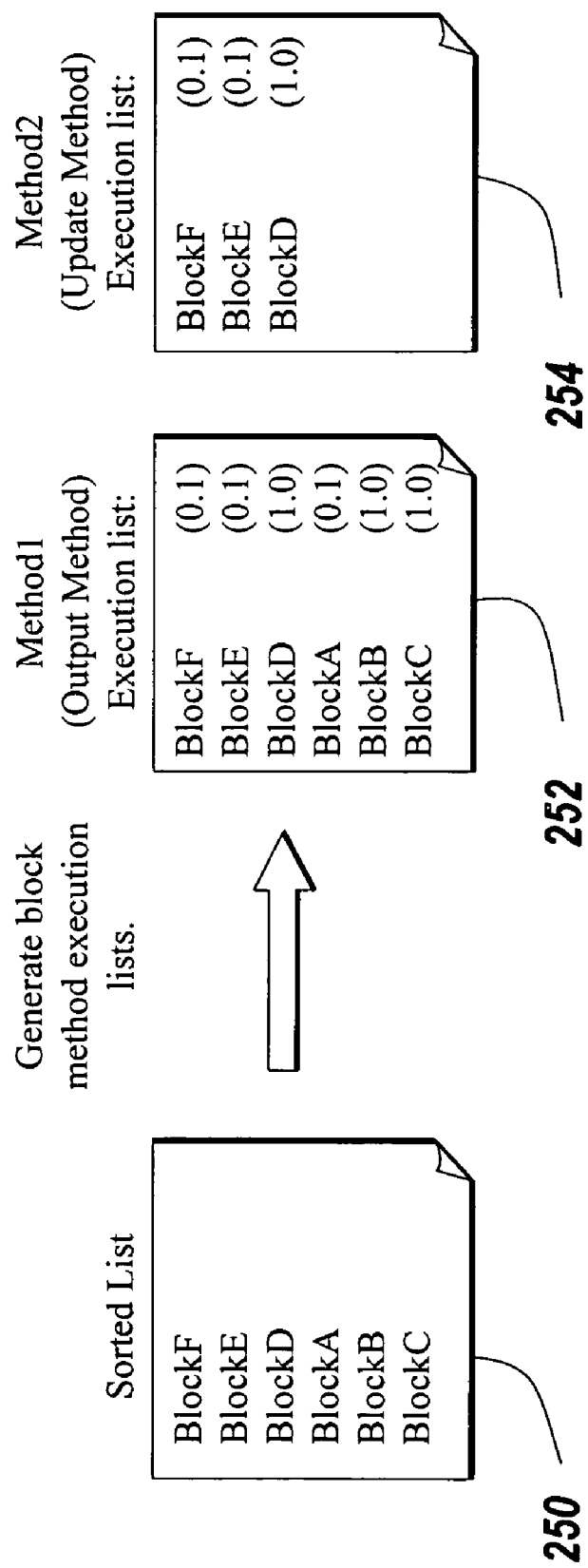
FIG. 11A depicts the creation of execution lists from sorted lists in single task mode.

Blocks are arranged in the single-tasking execution lists in the sorted order as shown in FIG. 11A. A sorted list 250 is used to generate an Output method execution list 252 and an Update method execution list 254. Referring back to the example in FIG. 7 and FIG. 8, the engine sequentially steps through and execute each block in the block method execution list when the execution time divided by the sample time equals an integer number (1, 2, 3, 4, etc.). At time zero ($T_0$), all the blocks are executed. This involves executing the Output methods for blocks F, E, D, A, B, and C (in this order as dictated by the sorted list) and then executing the Update methods of blocks F, E, and D (again, in this order based on the sorted list). The execution time is then incremented by step size, which in this case is assumed to be 0.1 seconds. Execution then commences once again at the top of the loop for T=0.1 ($T_{0.1}$). Blocks F and E have a sample time of 0.1 seconds and have a sample hit (0.1÷0.1=1, sample time is an integer multiple of the execution time), so the output block methods for Blocks F and E are executed. Block D, however, has a 1.0 second sample time and has no sample hit (0.1÷1.0=0.1, sample time is not an integer multiple of the execution time), so its output block method is not executed (essentially it is skipped). Block A, like Blocks F and E, has a 0.1 second sample time and so its output block method is executed. Blocks B and C, like Block D, have 1.0 second sample times and are skipped during this iteration of the simulation loop, which completes execution of the output block method execution list for $T_{0.1}$.

Figure 11B:
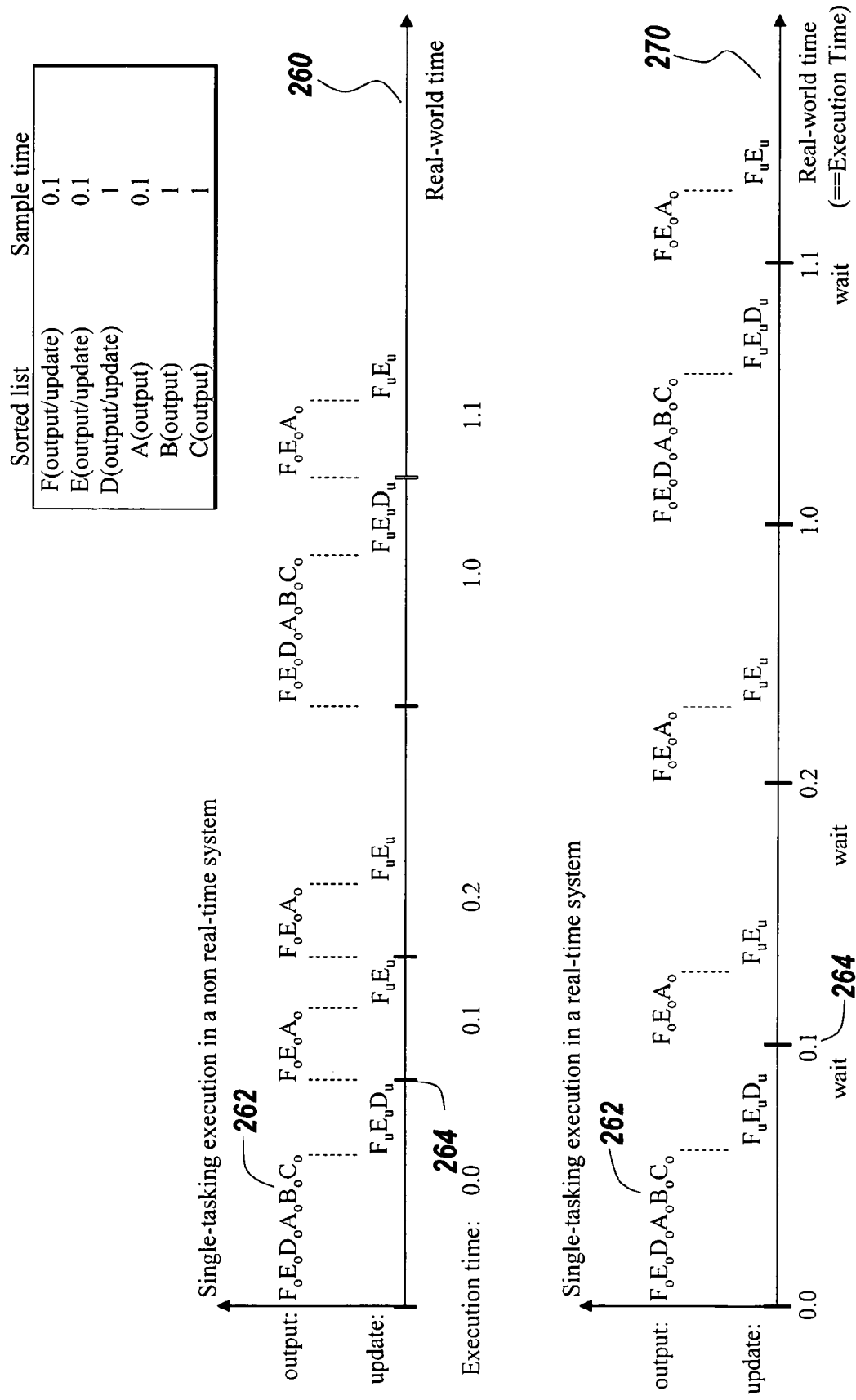
FIG. 11B depicts the execution timing of block diagrams in single task mode in timelines synchronized and non-synchronized with real world time.

The execution timing of the example block diagram in single task mode is shown in the first time-line of FIG. 11B. In this diagram, note that the execution-time is not synchronized with real-world time. Instead, execution time progresses as fast as it can in real-world time. The sorted list 259 is executed on the time-line 260. The methods in the list 262 are executed at the appropriate time step 264. Block diagram modeling software can also allow users to simulate real-world conditions by synchronizing execution time with real-world time. Such execution is illustrated in the second timing diagram of FIG. 11B. The methods 262 are implemented at a time-step 264 synchronized with real world time on the time line 270.

Figure 12A:
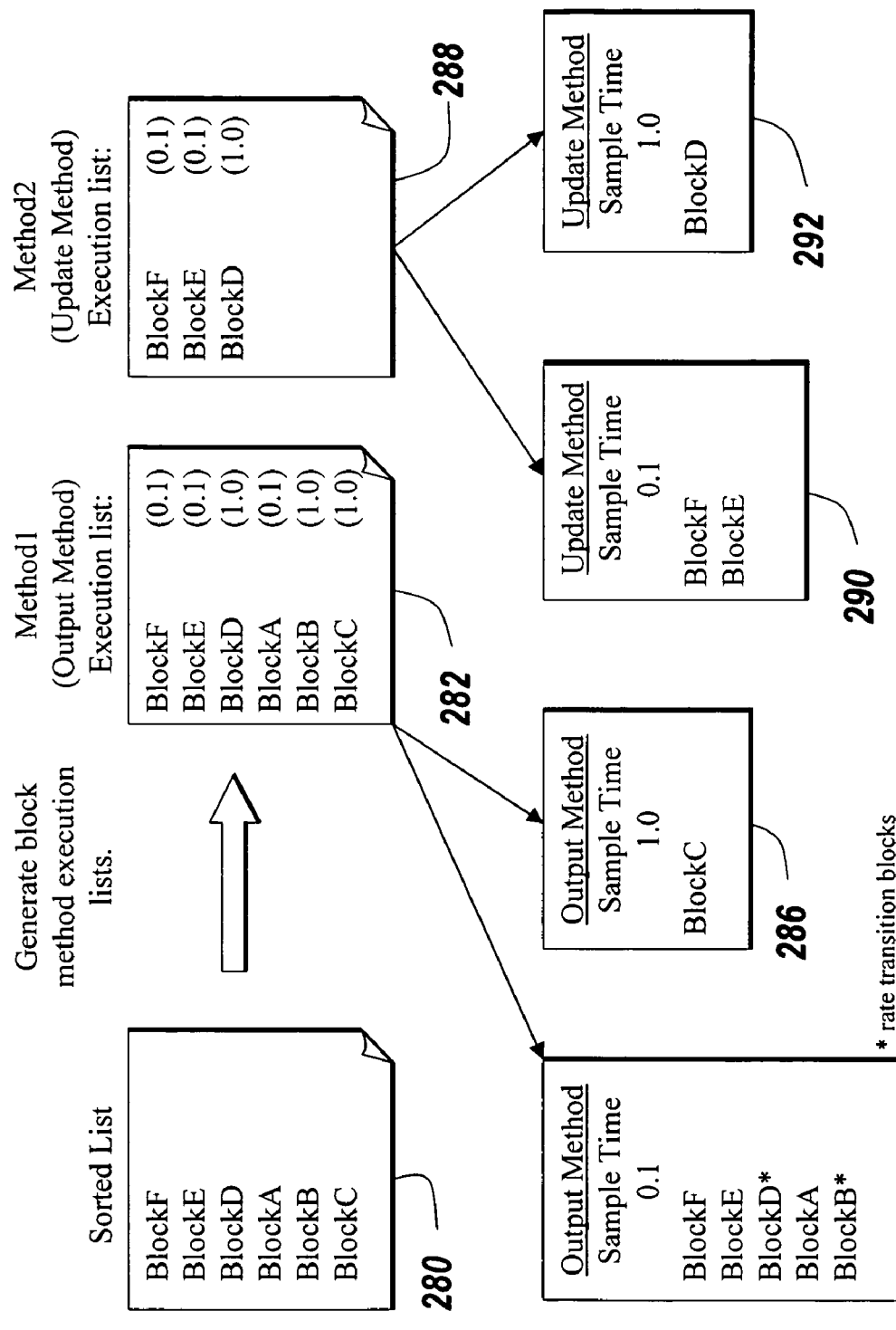
FIG. 12A depicts the creation of execution lists from sorted lists in multi-task mode.
Figure 13:
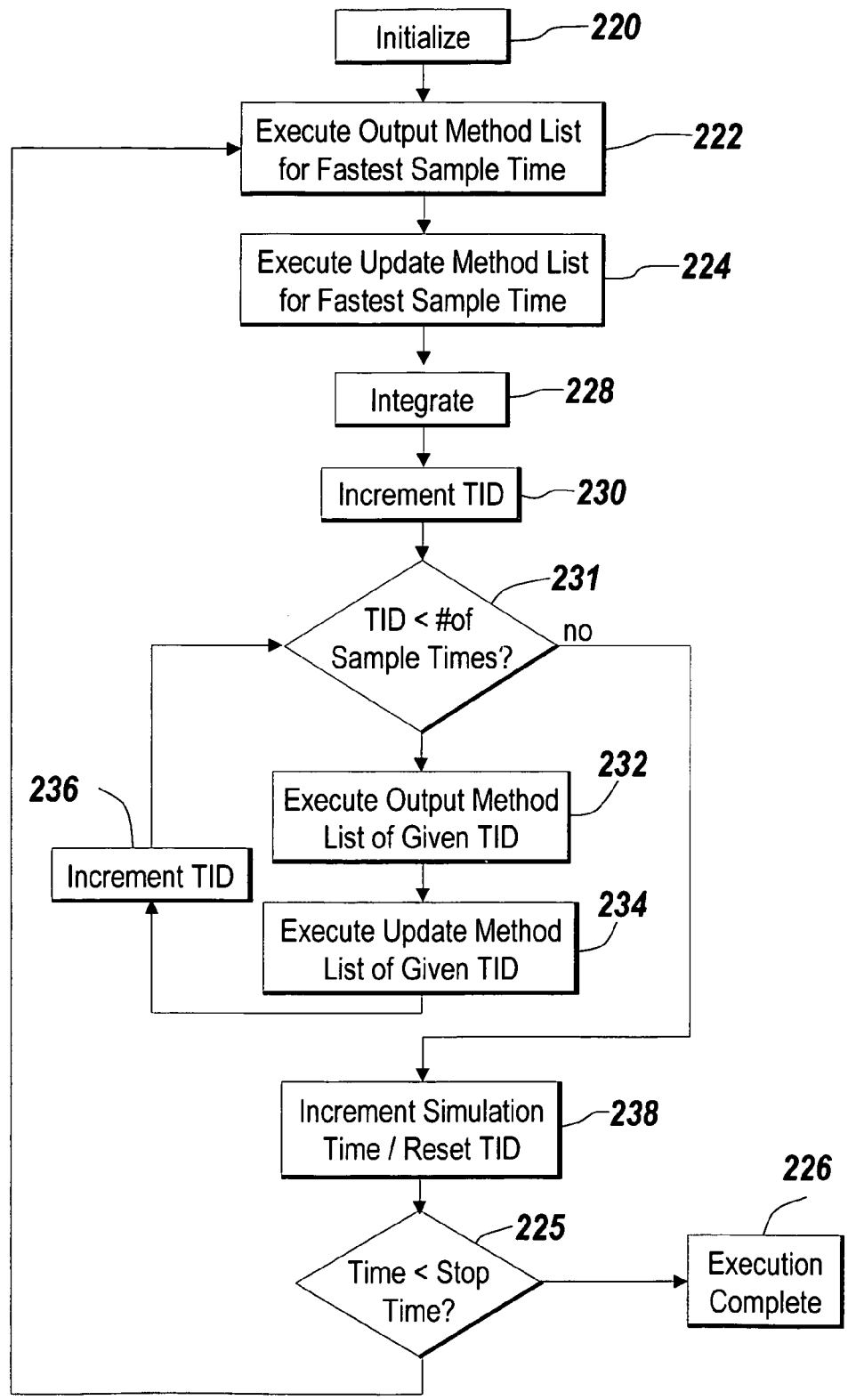
FIG. 13 is a flowchart of the overall sequence of steps taken by Simulink® in multi-task mode.

In multitask mode, the engine performs execution along multiple time-lines based upon the number of block sample times used in the mode as shown in the flowchart of FIG. 13. In the example of FIGS. 7 and 8, the model's blocks have a sample time of either 0.1 seconds or 1.0 second. This implies that the engine runs one set of blocks along a 0.1 second time line and another set of blocks along a 1.0 second time line. In order to run in multitask mode, the execution lists are first divided on the basis of methods (as in single-tasking mode) and then subdivided again based upon block sample times. This is illustrated in FIG. 12A. The sorted list 280 is used to generate an output method execution list 282 and update method execution list 288. The output method execution list 282 is split into two separate execution lists 284 and 286 based on sample times. Similarly, the update method execution list 288 is divided into two update method execution lists 290 and 292 based on sample times.

The execution engine 34 uses the divided execution lists to create multiple execution time lines. In the multitask mode the engine places a higher execution priority on the faster sample time blocks than the slower sample time blocks. This prioritization is carried out by assigning Task Identification Numbers (TIDs) to each execution list; the higher the priority, the lower the TID. For example, a TID of 0 executes at a higher priority than a TID of 1, and so forth. Furthermore, because during execution in multitask mode, execution transitions between the faster and slower blocks, and vice-versa, the multitask mode requires rate transition blocks that allow the model to transition from blocks running at fast sample times, in our example 0.1 seconds, to slower samples times, e.g., 1.0 seconds. The rate transition blocks are required to correctly simulate how a multi-rate system would behave in a real-time environment. To provide this transition, the engine promotes rate transition blocks to the TID of the fast block for which transition is being provided, although the engine executes these rate transition blocks at their slower rate. This is why Blocks D and B appear in the 0.1 sample time output method execution list in FIG. 12A.

Figure 12B:
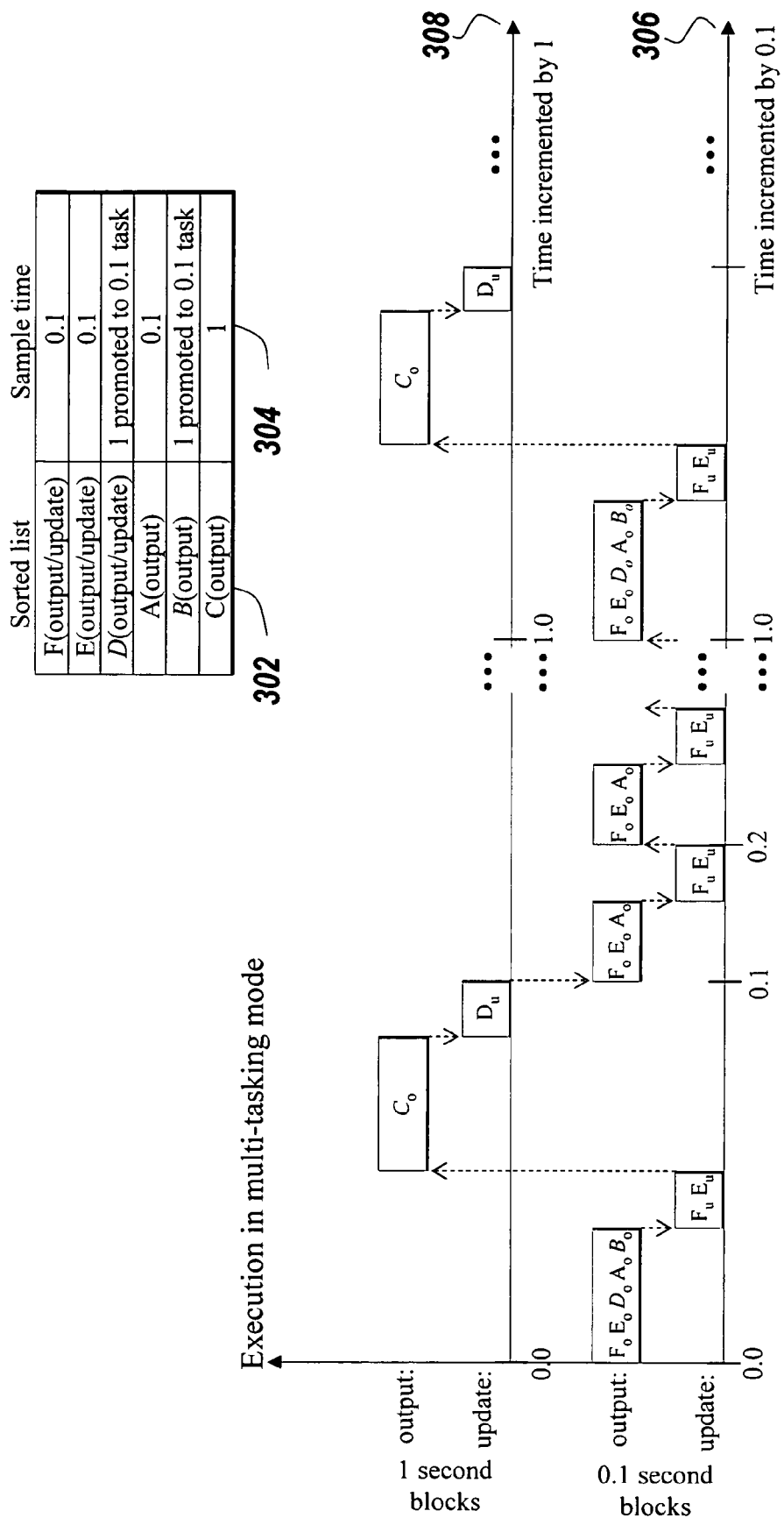
FIG. 12B depicts the execution timing of block diagrams in multi-task mode.

The execution of our example in the multi-task mode may be seen in FIG. 12B. At time T=0, the engine first executes the high priority output methods (those with TID 0) for Blocks F, E, D, A and B, then it executes the high priority update methods (those with TID 0) for Blocks F and E. After finishing the high priority blocks, the engine executes the lower priority output block methods (those with TID 1) for Block C, and then executes the lower priority update methods (those with TID 1), which, in this example, is Block D. In contrast to the single task mode, in multitask mode the engine runs through a TID inner loop to execute the output and update block methods before going on to the Integration step, as the flow chart in FIG. 13 which is discussed below illustrates.

As a result of the inner TID loop, as well as the segregated block method execution lists, the order of execution in multitask mode differs from the order of execution in single task mode. Recall for the example that in single task mode the order of execution at T=0 is: $F_o$, $E_o$, $D_o$, $A_o$, $B_o$, $C_o$, $F_u$, $E_u$, and $D_u$, where the subscript "o" stands for output method and the subscript "u" stands for update method. In the multitask mode, however, the order of execution at T=0 is: $F_o$, $E_o$, $D_o$, $A_o$, $B_o$, $F_u$, $E_u$, $C_o$, and $D_u$. Notice that $C_o$ is executed in a different order in multitasking mode. This occurs because separate method execution lists (based upon sample time) are created and run in order from fasted sample time to slowest sample time. Additionally, the use of rate transition blocks restricts the connection of blocks with different rates. By requiring the insertion of these blocks into the model, the engine ensures that execution in multitask mode will follow the sorted list.

After it has finished executing the block methods for T=0, like in the single task mode, the execution time is incremented (again assume by 0.1 seconds) and execution goes to the beginning of the loop. The engine executes $F_o$, $E_o$, $A_o$, $F_u$, and $E_u$, and the engine does not execute the block methods of Blocks D, B, and C because the current execution time is not an integer multiple of those block's sample time. The engine repeats this execution until the execution time is incremented to 1.0 seconds, whereupon execution occurs in the same manner as described for T=0. The engine repeats this overall process until the execution stop time is reached.

FIG. 12B shows two time-lines; the lower time-line 306 represents the execution order of the faster sample time blocks (Blocks A, E, and F), along with the rate transition blocks (Blocks B and D), while the top time-line 308 shows the execution order of the slower sample time block (Block C), and the rate transition (Block D) update method. The time-lines are generated from the sorted list 302 and the associated sample times 304. The lower line, representing the faster sample times has a TID of 0, and the top line has a TID of 1. For execution time T=0, the chart shows that the engine executes the output methods for Blocks F, E, D, A, and B (designated on the chart as $F_o$, $E_o$, $D_o$, $A_o$, $B_o$). Then, consistent with the flow chart for the multi-tasking mode (see FIG. 13 discussed below), the engine executes the update block methods for Blocks F and E (designated $F_u$, and $E_u$). Once the engine is finished with the high priority block methods, the output method for Block C ($C_o$) and the update method for rate transition block D ($D_u$) are executed. The execution time is then incremented by the step size (continue to assume 0.1 seconds) and the blocks that have a sample hit are executed. The figure shows execution of $F_o$, $E_o$, $A_o$, $F_u$, and $E_u$, which is repeated, as noted above, until execution time equals 1.0 second. Notice, like in the non-real-time case for Single-task mode, the engine does not wait for time to elapse; rather it executes block methods immediately upon completion of the previous pass through the loop.

FIG. 13 shows the overall sequence of steps taken by Simulink® in multitask mode. The initialization of the model is described below in more detail with reference to FIGS. 15-25. Following the initialization (step 220), the output method execution list is executed for the fastest sample time (step 222). The update method execution list is then executed for the fastest sample time (step 224). Next, the integrate stage (step 228) is performed. The task ID variable is incremented (step 230) and compared to a parameter of the number of sample times (step 231). If the task ID is less than the number of sample times and the task has a time hit, the output method execution list for the methods assigned the new task Id are executed (step 232) followed by the execution of the update method execution list assigned the new task ID (step 234). In a threaded environment, each task is run using preemptive priority based execution. The task ID variable is incremented and the process iterates with the task ID being compared to the number of sample rate times (step 231). After executing all tasks, individual task times are incremented, the task id counter is reset and task id hits are calculated (step 238). A time parameter is the checked (step 225) to determine if the time is less than a designated stop time. If the stop time has been reached, the simulation completes (step 226). Otherwise and the entire process iterates with the output method list execution list (step 222) being executed for the fastest sample times. The process continues until the end of simulation when the time equals the stop time (step 226).

In order to understand how the step size is picked within SimLoop, it is first necessary to understand the notion of a solver. The solver is a module of the execution engine 34 that is responsible for performing two tasks: (a) determining how far execution time should be advanced between consecutive passes through the SimLoop in order to accurately trace the system's outputs, and (b) integrating the derivative of the states of the system to obtain the actual states. Based on how solvers performs the first task, they are generally classified into two basic classes: Fixed-step solvers or Variable-step solvers.

Fixed-step solvers are solvers in which the time step-size between consecutive passes through the SimLoop is a fixed quantity. The user generally explicitly specifies this quantity. These solvers are used to model types of systems that must operate within a defined time (discrete systems). For instance, an anti-lock braking system may be designed to control a car's braking system, and to execute such control in one hundredth (0.01) of a second so as to assure the car stops safely; if the braking system does not meet its timing constraints, the car may crash. Fixed-step solvers, therefore, are designed to help model discrete systems that have to generate a result in a fixed time period, and the fixed-step execution assures that the modeled system can generate such results.

Variable-step solvers are designed to model continuous systems where non-evenly spaced time steps are needed to simulate all significant behavior. For example, one may want to simulate the path of a bouncing ball, where it bounces, how high it bounces, and where it stops. It is known, based on experience, that the ball's bounces will not be evenly spaced, and that the height of the bounces will diminish as a result of gravity, friction, and other forces. Variable-step solvers are used for these types of continuous systems and to determine what step size to use so that the behavior of the ball will be accurately modeled.

The two broad classes of solvers are further subdivided based on the integration task they perform. There are several algorithms for carrying out numerical integration. The particular choice of the integration algorithm gives rise to the subclasses of solvers.

Figure 14:
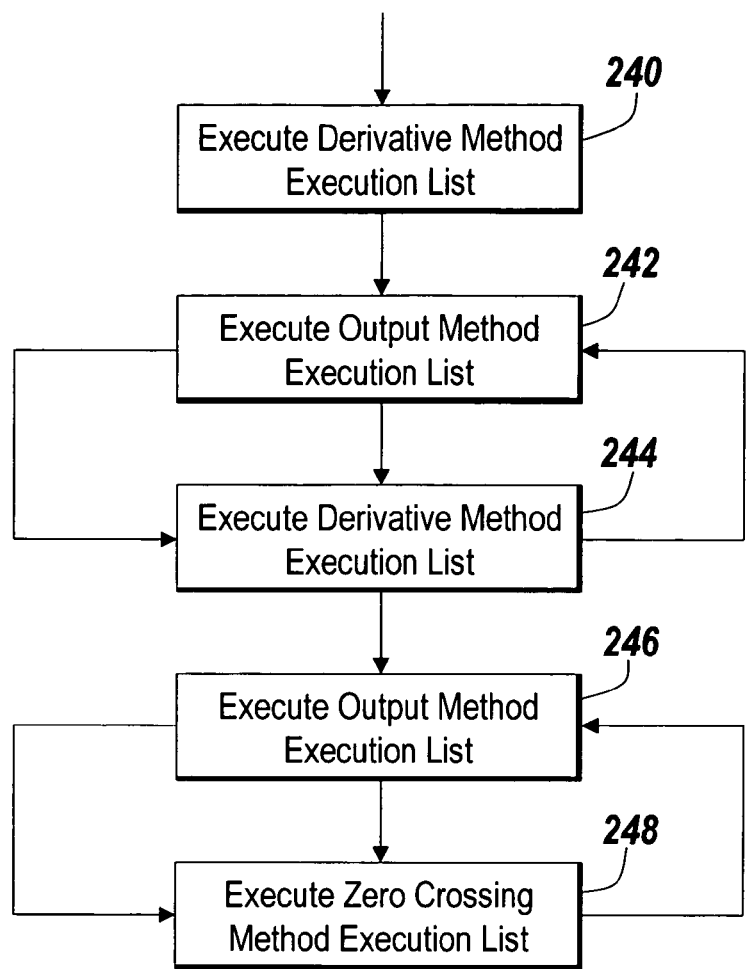
FIG. 14 is a flowchart of the sequence of steps followed by a variable-step solver.

The difference in the conceptual definition of Fixed- and Variable-step solvers leads to the functional difference in the context of the SimLoop. The major difference between the solvers arises in the Integrate step of the SimLoop which is depicted in FIG. 14. During the Integrate step, the Variable-step solver executes the Output and Derivative block method lists for a number of iterations that varies based on the solver subclass (i.e., the numerical integration algorithm it uses) and integration error tolerances. In a fixed-step solver, the number of iterations is fixed for a given solver subclass. Another difference between solvers arises in the Integrate phase in the context of an operation known as zero-crossing detection. Zero-crossings indicate a discontinuity in the system behavior. Because discontinuities often indicate a significant change in a dynamic system, it is important to trace the system outputs precisely at such points. Otherwise, the outputs of the model could lead to false conclusions about the behavior of the system under investigation. Consider, again the example of the bouncing ball. If the point at which the ball hits the floor occurs between simulation steps, the simulated ball appears to reverse position in midair. This might lead an investigator to false conclusions about the physics of the bouncing ball. To avoid such misleading conclusions, it is important that the execution has time steps on and around the vicinity of discontinuities.

An example of the variable-step solver is shown in FIG. 14, the derivative method execution list is executed (step 240) followed by the output method execution list (step 242). The derivative method execution list is then executed again (step 244) and the solver iterates between the execution of the output method execution list (step 242) and the execution of the derivative method execution list (step 244). A similar iteration loop then occurs between the execution of the output method execution list (step 246) and the execution of the zero-crossing method execution list (step 248). Note that Simulink® also includes other methods such as Projections and Jacobians in this step as needed.

While it is theoretically possible to have Variable-step solvers in the context of multitasking, such a combination is not employed in practice. This is because the step-size for such solvers can become very small making it impossible to keep up with the real-time constraint that generally goes along with multitasking execution. An added complication is that the integration step in such solvers is iterative and takes varying amounts of time at each step of the execution. Therefore, Variable-step solvers are generally used only in conjunction with the Single-Tasking SimLoop. Additionally, they are not usually employed in systems that need to operate in real-time.

When a model contains an algebraic loop, the engine calls a loop solving routine at each time step. The loop solver performs iterations and perturbations to determine the solution to the algebraic condition (if it can). One possible approach to solving the algebraic equation $F(z)=0$, is to use Newton's method with weak line search and rank-one updates to a Jacobian matrix of partial derivatives. Although the method is robust, it is possible to create loops for which the loop solver will not converge without a good initial guess for the algebraic states z. Special blocks are generally provided to specify an initial guess of the states in the algebraic loop solver.

In addition to the various forms of the SimLoop, modeling packages such as Simulink® use the output of the Link stage to compute linear models through a process generally referred to as model linearization. These linear models may be used in the SimLoop at various points in the execution of the overall model. Alternatively, the linear model may be returned to the user. The linearization process involves the use of a Jacobian method defined on blocks and numerical Jacobian algorithm.

Information related to the compiled block diagram may be presented to users in an automatically generated report. This report allows users to quickly obtain documentation of the functional description of their model. Information related to the execution of a particular model (such at the time taken to execute various portions of the model and the coverage of various portions of the model) may be obtained automatically and presented to the user as a report.

Initialization of Block Diagram

The illustrative embodiment of the present provides handshaking communication mechanisms between blocks for initializing the blocks in the initialization steps 200 and 220 depicted in FIG. 10 and FIG. 13, respectively. In the illustrative embodiment, the blocks may require information from other blocks to initialize the blocks. The blocks perform handshaking communications with other blocks to receive information needed for the initialization of the blocks. The initialization mechanism may utilize execution contexts (ECs) to initialize the blocks, which will be described below in more detail with reference to FIGS. 23-25. The illustrative embodiment initializes the blocks prior to entering the Simulation Loop, and hence removes initialization-related processes from the Simulation Loop.

Figure 15:
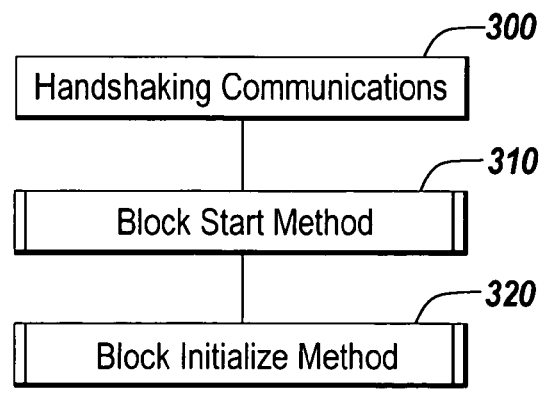
FIG. 15 is a flowchart showing an exemplary operation for the initialization of a block diagram in the illustrative embodiment.

FIG. 15 is a flow chart showing an exemplary operation for the initialization of blocks in the block diagram in the illustrative embodiment. In the initialization of the blocks, the handshaking communications are first performed between blocks in the block diagram (step 300). The illustrative embodiment utilizes the block initialization flags in the handshaking communications between blocks. The block initialization flags are exchanged between connected blocks through a handshaking procedure. Based on the results of the handshaking communication, the blocks partition the initialization tasks among different methods, such as BlockStart method, BlockInitalize method and BlockOutput method, and determine whether the block actually needs to initialize the states of the blocks. The handshaking communications can also be used for partitioning the initialization and other simulation tasks for other run-time methods such as Simulink® BlockUpdate, BlockDerivative, BlockProjection, BlockZeroCrossing, etc. This can also extend to other executable block diagram paradigms such as data flow diagrams, electrical diagrams, state flow diagrams, mechanical diagrams, etc.

The block initialization flags include two input port flags and two output port flags. Each block input port has two flags for the handshaking communication:

(1) RequestReadInputInInitialize: this flag indicates whether a block request to read the initial output signals of its source output ports in the Block Initialize method. This flag is set by individual blocks before the handshaking communication begins. For example, an Integrator block sets this flag to TRUE for its external initial condition (IC) port; and (2) OKToReadInputInInitialize: this flag denotes whether a block input port can actually read the output signals of its source output ports in the Block Initialize method, i.e. whether its source output ports write out the initial output signals. This flag is set through the handshaking communication between block ports.

Each block output port also has two flags for the handshaking communication:

(1) CanComputeOutputInStart: this flag indicates whether a block output port can write out the initial output value in the Block Start method. This flag is set by individual blocks before handshaking communication begins. For example, a Constant block sets this flag to TRUE since it can write its value to the output buffer in the Block Start method; and (2) WriteOutputInStart: this flag indicates whether a block output port actually writes out the initial output value in the Block Start method. This flag is set during the handshaking communication.

Figure 16:
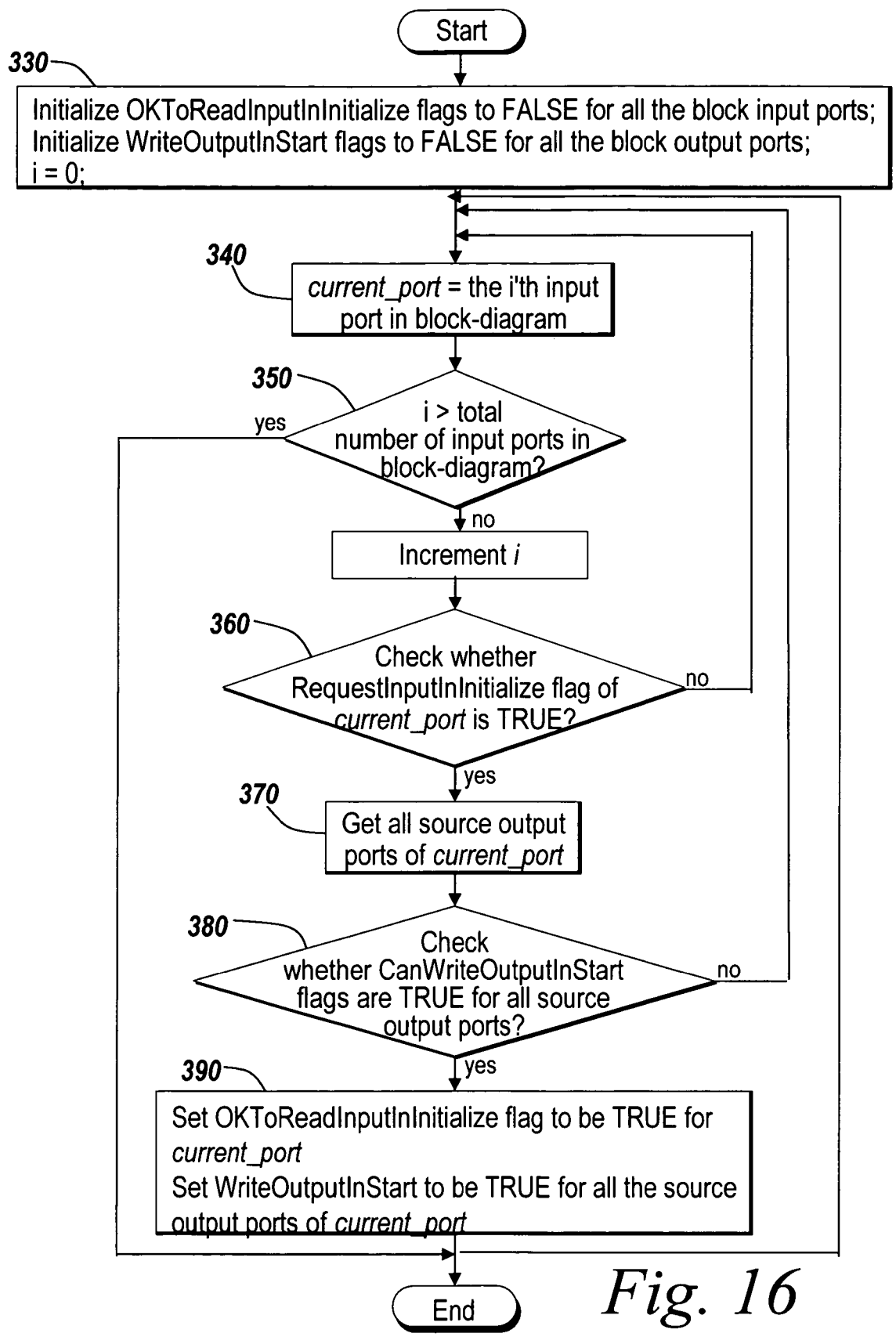
FIG. 16 is a flowchart showing an exemplary operation for handshaking communications between blocks in the initialization of a block diagram.

FIG. 16 is a flow chart showing an exemplary operation for the handshaking communications between blocks using the input and output port initialization flags. In the handshaking algorithm, the OKToReadInputInInitialize flags for all block input ports are initialized to FALSE (step 330). The WriteOutputInStart flags for all block output ports are also initialized to FALSE (step 330). With respect to all of the block input ports in the block diagram (steps 340 and 350), if the RequestInputInInitialize flag of each current input port is TRUE (step 360), the illustrative embodiment checks all the actual source output ports of the current input port (step 370). If the CanWriteOutputInStart flags are true for all the source output ports of the current input port (step 380), the illustrative embodiment sets WriteOutputInStart flags to TRUE for all the source output ports of the current input port, and also sets OKToReadInputInInitialize flag to TRUE for the current input port (step 390). If the CanWriteOutputInStart flag for any of the source output ports of the input port is FALSE (step 380), the illustrative embodiment sets WriteOutputInStart flags to FALSE for all the source output ports of the input port, and also sets the OKToReadInputInInitialize flag to FALSE for this input port.

Figure 17:
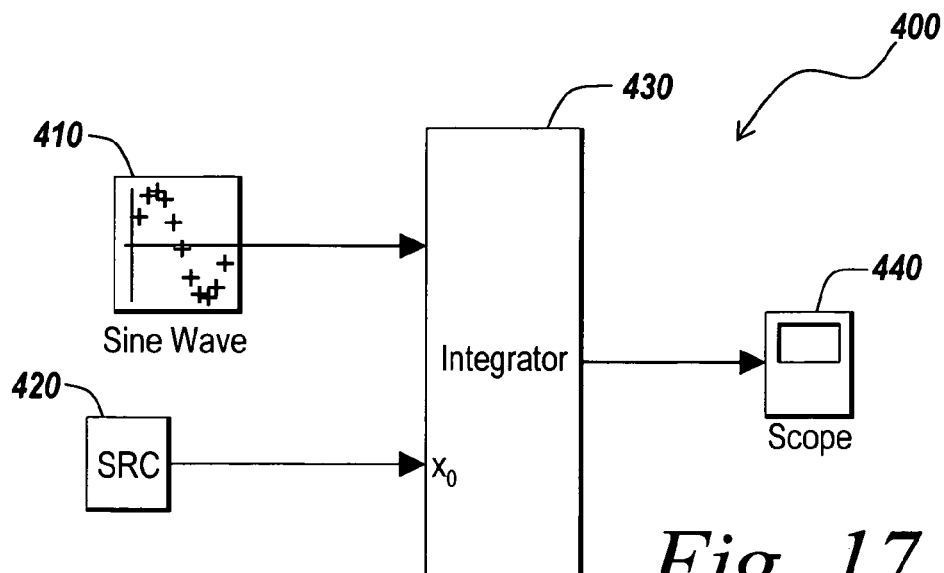
FIG. 17 depicts an exemplary block diagram initialized for execution in the illustrative embodiment.

FIG. 17 depicts an exemplary block diagram 400 initialized for execution in the illustrative embodiment of the present invention. The block diagram 400 includes an Integrator block 430 receiving an input signal from Sine Wave block 410 and producing an output signal to Scope block 440. The Integrator block 430 has an external initial condition (IC) input port (marked as "x0") connected to SRC block 420. The SRC block 420 writes out its initial output signal in the Block Start method (step 310 in FIG. 15), and the Integrator block 430 reads the IC input value from the IC input port and uses this value to initialize the state of the Integrator block 430 in the Block Initialize method (step 320 in FIG. 15), which will be described below in more detail with reference to FIG. 21 and FIG. 22.

Figure 18:
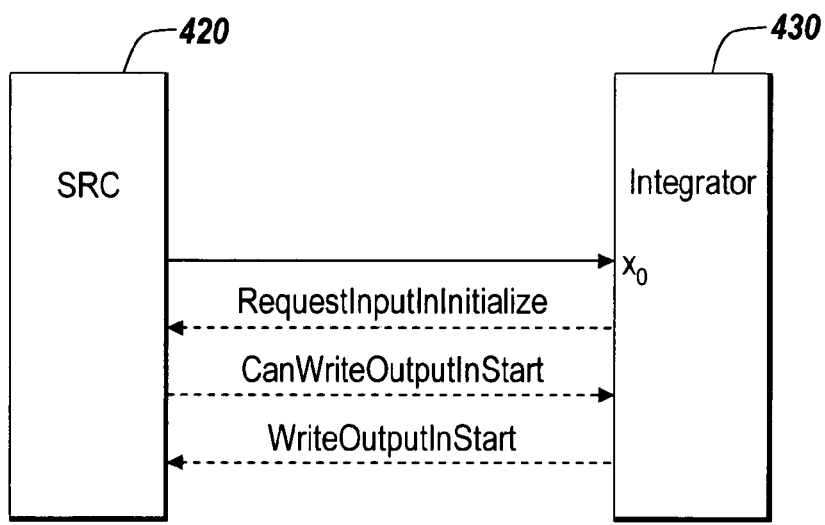
FIG. 18 shows an exemplary operation for a handshaking communication between the SRC block and the Integrator block depicted in FIG. 17 utilizing initialization flags.

FIG. 18 is an exemplary diagram showing the handshaking communications between the Integrator block 430 and the SRC block 420 using the initialization flags. The arrow on each dashed line denotes the direction of the handshaking message that is sent back and forth between block ports. The contents of each handshaking message (initialization flags) are listed in connection with the dashed line. The IC input port of the Integrator block 430 is connected to the output port of the SRC block 420. The IC input port of the Integrator block 430 requests to read the input value in the Block Initialize method (RequestInputInInitialize flag). The output port of the SRC block 420 determines whether it can write out an initial output value in the Block Start method (CanWriteOutputInStart flag). If the output port of the SRC block 420 can write out an initial output value in the Block Start method, the SRC block 420 is configured to write out an initial output value in the Block Start method (WriteOutputInStart flag), and the IC input port of the Integrator block is enabled to read the input value in the Block Initialize method (OKToReadInputInInitialize). If the output port of the SRC block 420 can not write out an initial output value in the Block Start method, the SRC block 420 is not configured to write out an initial output value in the Block Start method, and the IC input port of the Integrator block is not enabled to read the input value in the Block Initialize method.

Figure 19:
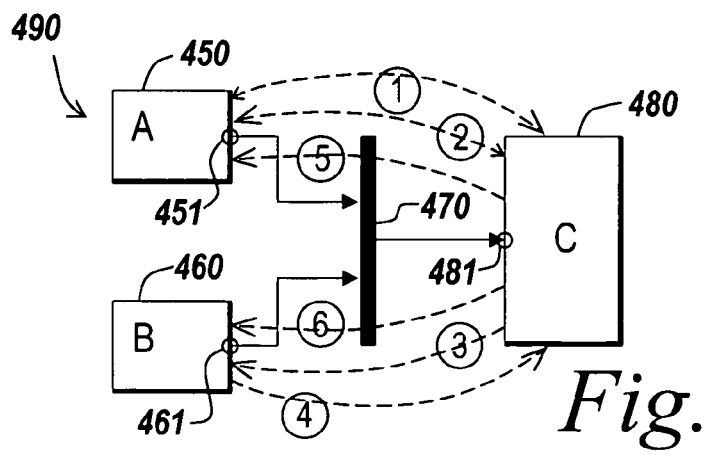
FIG. 19 shows another handshaking communication between blocks in the initialization of a block diagram.

FIG. 19 is another exemplary block diagram showing handshaking communications between blocks in a block diagram 490. In the block diagram 490, the input port of C block 480 is connected to the output port of Mux block 470 whose input ports are connected to the output port 451 of A block 450 and output port 461 of B block 460. The C block 480 receives an input signal from the Mux block 470 that multiplexes the output signals of the A block 450 and B block 460. Blocks connected to each other in the block diagram 490 perform handshaking communications, as described above with respect to FIG. 16 and FIG. 18, and the results of the handshaking communications are propagated throughout the diagram 490. If the input port 481 of the C block 480 requests to read the input value in the Block Initialize method of the C block 480 (①) and ③) and both of the output ports 451 and 461 of the A and B blocks 450 and 460 can write out initial output values in their Block Start methods ((②) and ④)), the result of the handshaking communication is that the output ports 451 and 461 of the A and B blocks 450 and 460 are configured to write out initial output values in their Block Start methods ((⑤) and ⑥)) and the input port 481 of the C block 480 is set to read an input value in its Block Initialize method. If at least one of the output ports 451 and 461 of the A and B block 450 and 460 cannot write out an initial output value in their Block Start methods ((②) and ④)), the result of the handshaking communication is that the output ports 451 and 461 of the A and B blocks 450 and 460 are not configured to write out initial output values in their Block Start methods ((⑤) and ⑥)) and the input port 481 of the C block 480 is not set to read an input value in its Block Initialize method.

Figure 20:
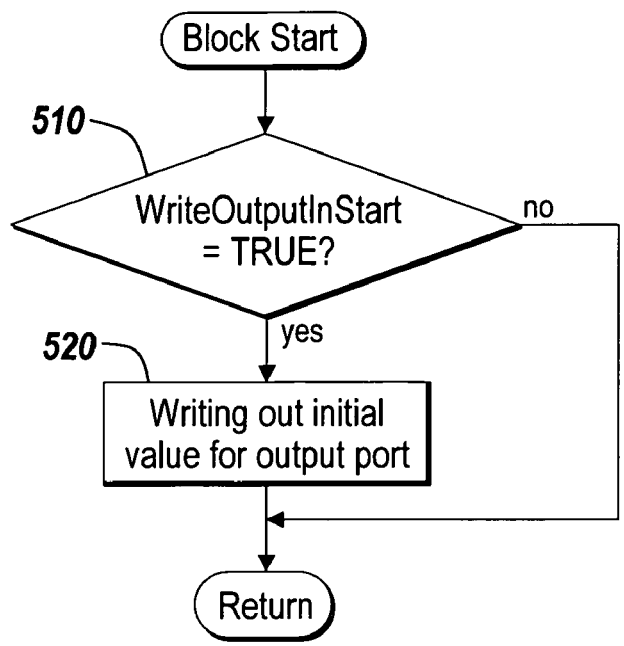
FIG. 20 is a flowchart showing an exemplary operation for the Block Start method depicted in FIG. 15.

Referring back to FIG. 15, after the handshaking communications between blocks in the block diagram, each of the blocks determines whether to write out the initial output value for the output port in the Block Start method depending on the WriteOutputInStart flag (step 310). FIG. 20 is a flow chart showing an exemplary operation of the Block Start method in the illustrative embodiment. If the flag WriteOutputInStart is TRUE for the block output port (step 510), the block writes out the initial output value for the output port (step 520). If the flag WriteOutputInStart is FALSE for the block output port, the illustrative embodiment does not need to write out the initial output value for the output port.

Figure 21:
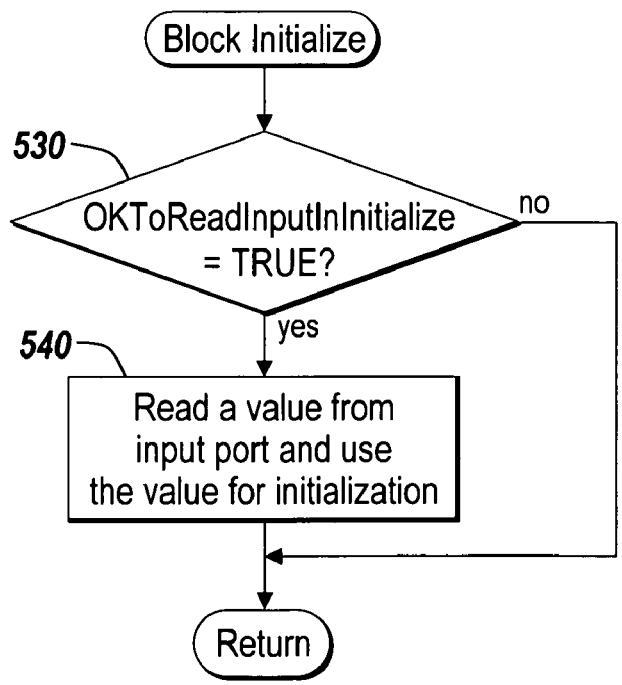
FIG. 21 is a flowchart showing an exemplary operation for the Block Initialize method depicted in FIG. 15.

Referring back to FIG. 15, after each of the blocks writes out the initial output value for the output port in the Block Start method, the illustrative embodiment of the present invention reads the value from the input port and uses this value for the initialization of the block, e.g. initializing the state of the block, depending on the OKToReadInputInInitialize flag in Block Initialize method (step 320). FIG. 21 is a flow chart showing an exemplary operation of the Block Initialize method in the illustrative embodiment. If the OKToReadInputInInitialize flag is TRUE for a block input port (step 530), the value is read from the input port and used for initialization (step 540). If the OKToReadInputInInitialize flag is FALSE for a block input port, the illustrative embodiment does not read the value from the input port.

The handshaking communication mechanism in the illustrative embodiment of the present invention provides an optimal way to initialize the state of the Integrator block 430 with a value prior to entering a simulation loop. The generated code of the illustrative embodiment of the present invention does not require an extra Boolean flag and an extra if-condition to determine whether it needs to read in the IC port value and use this value to initialize the state of the Integrator block at every simulation loop. Furthermore, the illustrative embodiment of the present invention enhances the readability of the algorithm in the BlockOutputs method because the extra code for handling the external IC is removed from the output algorithm. An exemplary code for the illustrative embodiment is provided below for FIG. 17 as compared with the exemplary code for the conventional approach.

| Conventional approach | Hand-shaking based approach |
|---|---|
| ```
void MdlStart(void)
{
    rtB_SRC = sys function( . . . );
}
void MdlInitialize(void)
{
    rtDWork.Disc_Time_Integr_IC_LOADING = true;
}
void MdlOutputs(int_T tid)
{
    /* Compute output of SRC block */
    rtB_SRC = sys function( . . . );
    /*
     * If IC has not been loaded, get the output value of SRC block
     * and load it into Discrete Integrator block's DSTATE as the
     * IC. Also reset the IC_LOADING flag to false so that loading IC
     * happens only the first time MdlOutput is called.
     */
    if ( rtDWork.Disc_Time_Integr_IC_LOADING) {
        rtDWork.Disc_Time_Integr_DSTATE = rtB_SRC;
        rtDWork.Disc_Time_Integr_IC_LOADING = false;
    }
    /* Compute output of Discrete Integrator block */
    rtB_Disc_Time_Integr = rtDWork.Disc_Time_Integr_DSTATE;
    /* Compute output of Sine Wave block */
    rtB.Sine_Wave = sine_wave_function( . . . );
    rtY.Out1 = rtB_Disc_Time_Integr;
}
void MdlUpdate(int_T tid)
{
    rtDWork.Disc_Time_Integr_DSTATE =
        rtDWork.Disc_Time_Integr_DSTATE+ rtB.Sine_Wave
}
``` | ```
void MdlStart(void)
{
    rtB_SRC = sys function( . . . );
}
void MdlInitialize(void)
{
    rtDWork.Disc_Time_Integr_DSTATE = rtB_SRC;
}
void MdlOutputs(int_T tid)
{
    /* Compute output of SRC block */
    rtB_SRC = sys function( . . . );
    /* Compute output of Discrete Integrator block */
    rtB_Disc_Time_Integr =
        rtDWork.Disc_Time_Integr_DSTATE;
    /* Compute output of Sine Wave block */
    rtB.Sine_Wave =sine_wave_function( . . . );
    rtY.Out1 = rtB_Disc_Time_Integr,
} void MdlUpdate(int_T tid)
{
    rtDWork.Disc_Time_Integr_DSTATE =;
        rtDWork.Disc_Time_Integr_DSTATE+
    rtB.Sine_Wave;
}
``` |

Execution Contexts

The handshaking configuration mechanisms of the present invention can be extended to handle more general scenarios by leveraging the execution contexts (ECs) technology, which is described in more detail in a pending application entitled "A SYSTEM AND METHOD FOR USING EXECUTION CONTEXTS IN BLOCK DIAGRAM MODELING" (U.S. patent application Ser. No. 10/414,644) filed on Apr. 16, 2003, which is incorporated herewith by reference.

The illustrative embodiment allows an input port that has requested to read input signal in the Block Initialize function to set up an execution context and allow the handshaking message to propagate through the execution context.

Figure 22:
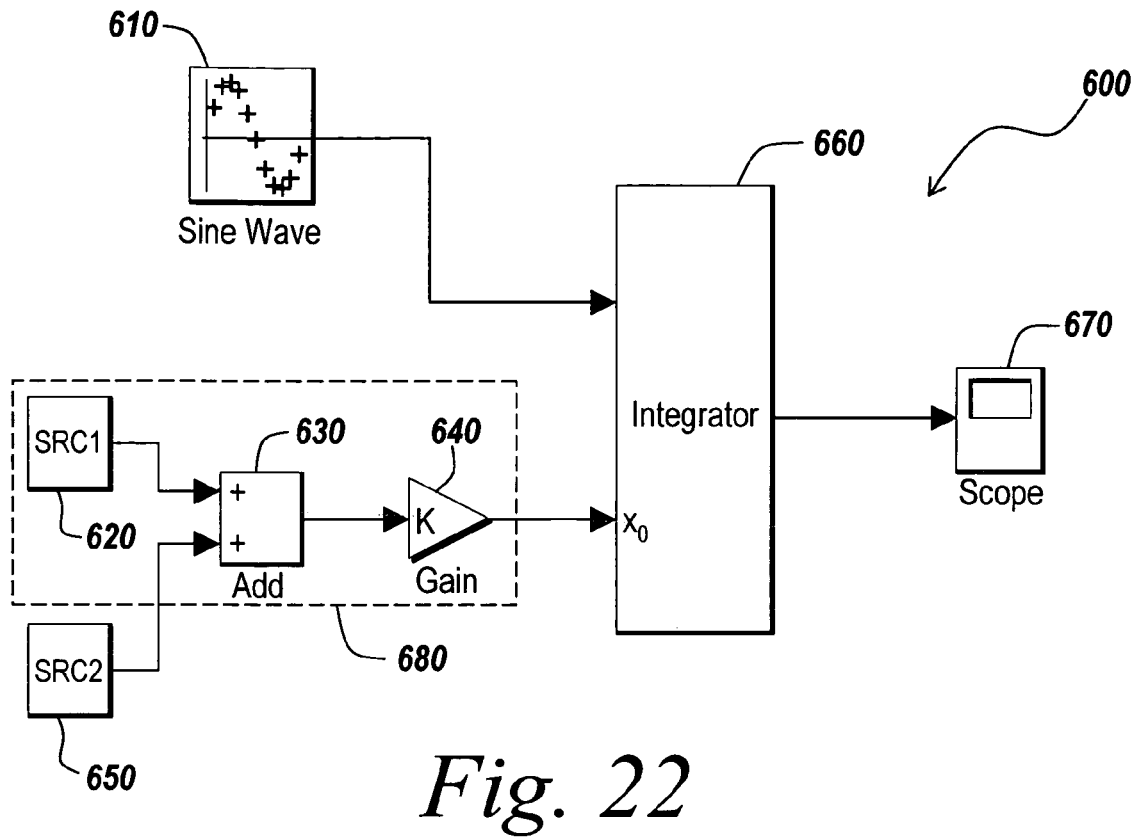
FIG. 22 depicts another exemplary block diagram initialized for execution utilizing execution contexts in the illustrative embodiment of the present invention.

FIG. 22 is an exemplary block diagram 600 initialized using the handshaking communications and execution contexts. The block diagram 600 includes an Integrator block 660 receiving an input signal from Sine Wave block 610 and producing an output signal to Scope block 670. The Integrator block 660 has an external initial condition (IC) input port (marked as "x0") connected to the output port of Gain block 640, which receives an input signal from Add block 630 that adds the output signals of SRC1 block 620 and SRC2 block 650. The Gain block 640 can not write out its initial output signal in the Block Start method. Using the handshaking algorithm described above, the OKToReadInputInInitialize flag for the IC port of the Integrator block 660 is set to FALSE after the handshaking communication.

Figure 23:
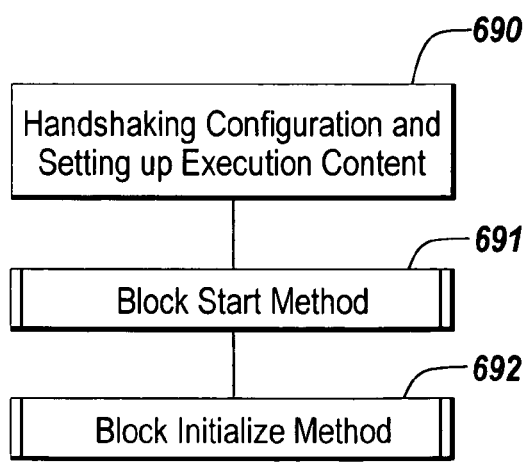
FIG. 23 is a flowchart showing an exemplary operation for the initialization of a block diagram in the illustrative embodiment, which utilizes execution contexts.

The execution contexts, however, enable the Integrator block 660 to be initialized in the Block Initialize method. FIG. 23 is a flow chart showing an exemplary operation for the initialization of blocks using the execution contexts in the illustrative embodiment. The handshaking configurations are first performed using the block initialization flags described above (step 690). The external IC input port of the Integrator block 660 sets up an execution context 680 that includes the Add block 630, Gain block 640 and SRC1 block 620 (step 690). The SRC2 block 650 is not shown to be part of the execution context to illustrate, for example, blocks whose output function relies on absolute time. If the source output ports of the execution context 680, which is the output port of SRC2 block 650 in the illustrative embodiment, can write out their initial output signals in their Block Start methods (step 691), the Integrator block 660 calls the BlockOutputs method of the execution context 680 in its Block Initialize method, and then uses the output signal produced from the execution of the execution context 680 to initialize the state of the Integrator block 660 (step 692).

Figure 24:
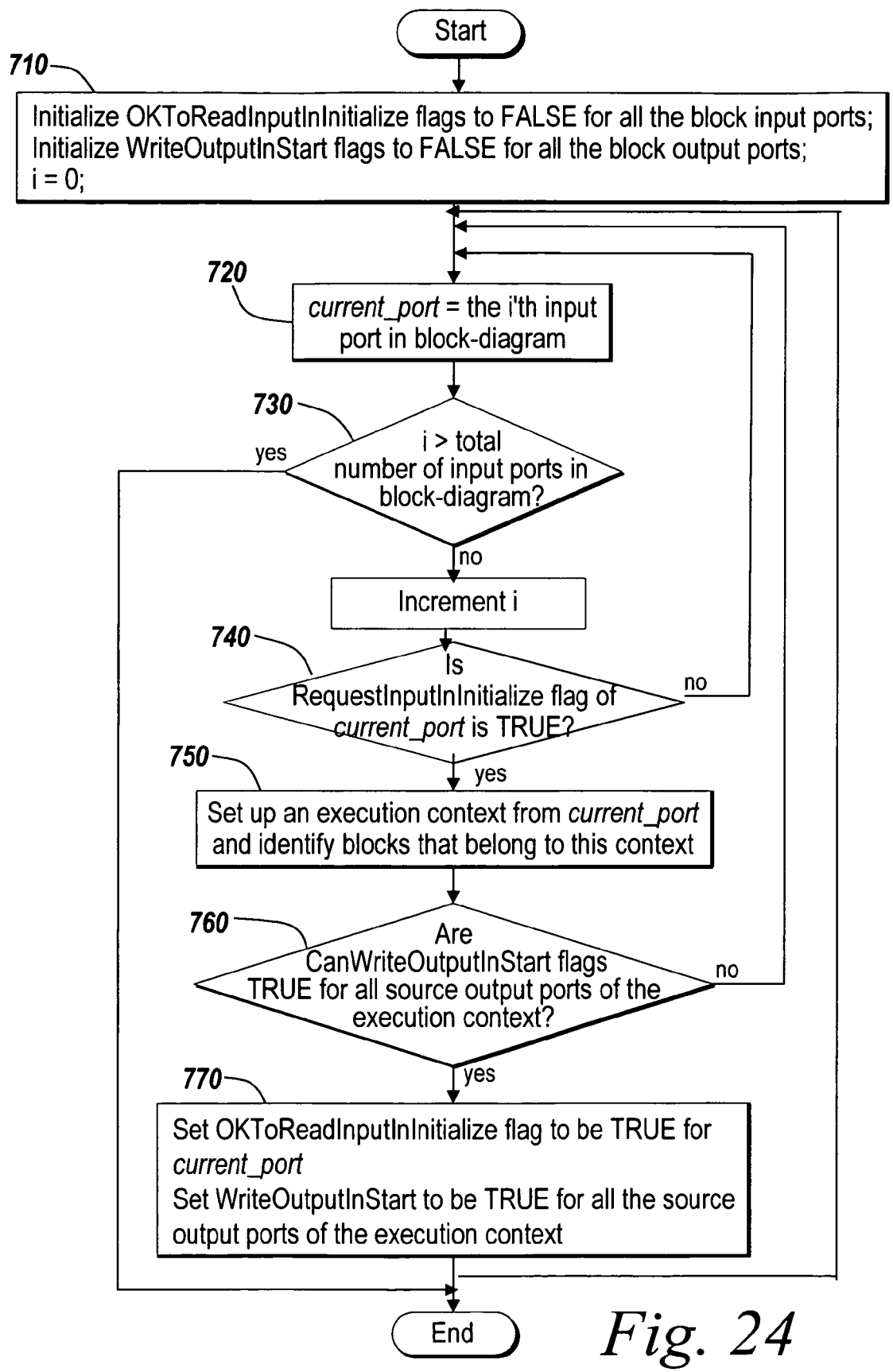
FIG. 24 is a flowchart showing an exemplary operation for handshaking communications between blocks in the initialization of a block diagram, which utilizes execution contexts.

FIG. 24 is a flow chart showing the handshaking communications between element blocks in the block diagram 600. The OKToReadInputInInitialize flags are initialized to FALSE for all block input ports of the model 600, and the WriteOutputInStart flags are also initialized to FALSE for all block output ports of the model 600 (step 710). For each current block input port (steps 720 and 730), if the RequestInputInInitialize flag of the current input port is TRUE (step 740), an execution context is set up from the current input port, and blocks belonging to the execution context are identified using the propagation algorithm described in co-pending U.S. patent application Ser. No. 10/414,644 entitled "A SYSTEM AND METHOD FOR USING EXECUTION CONTEXTS IN BLOCK DIAGRAM MODELING" (step 750). In the exemplary block diagram 600 depicted in FIG. 22, the execution context 680 is set up to include the Add block 630, Gain block 640 and SRC1 block 620. For an input port whose RequestInputInInitialize flag is TRUE, all the actual source output ports of the execution context 680 is checked. In the exemplary block diagram 600 depicted in FIG. 22, the source output ports of the execution context 680 are the output port of SRC2 block 650. If the CanWriteOutputInStart flags are true for all the source output ports of the execution context 680 (step 760), the WriteOutputInStart flags are set to TRUE for all the source output ports of the execution context 680, and the OKToReadInputInInitialize flag is set to TRUE for the current input port (step 770). If the CanWriteOutputInStart flag for any of the source output ports of the execution context 680 is FALSE, the WriteOutputInStart flags are set to FALSE for all the source output ports of the execution context 680, and the OKToReadInputInInitialize flag is set to FALSE for the current input port.

In the Block Start method (step 691 in FIG. 23), if the flag WriteOutputInStart is TRUE for the block output port, the illustrative embodiment writes out the initial output value for the output port. If the flag WriteOutputInStart is FALSE for the block output port, the illustrative embodiment does not need to write out the initial output value for the output port.

Figure 25:
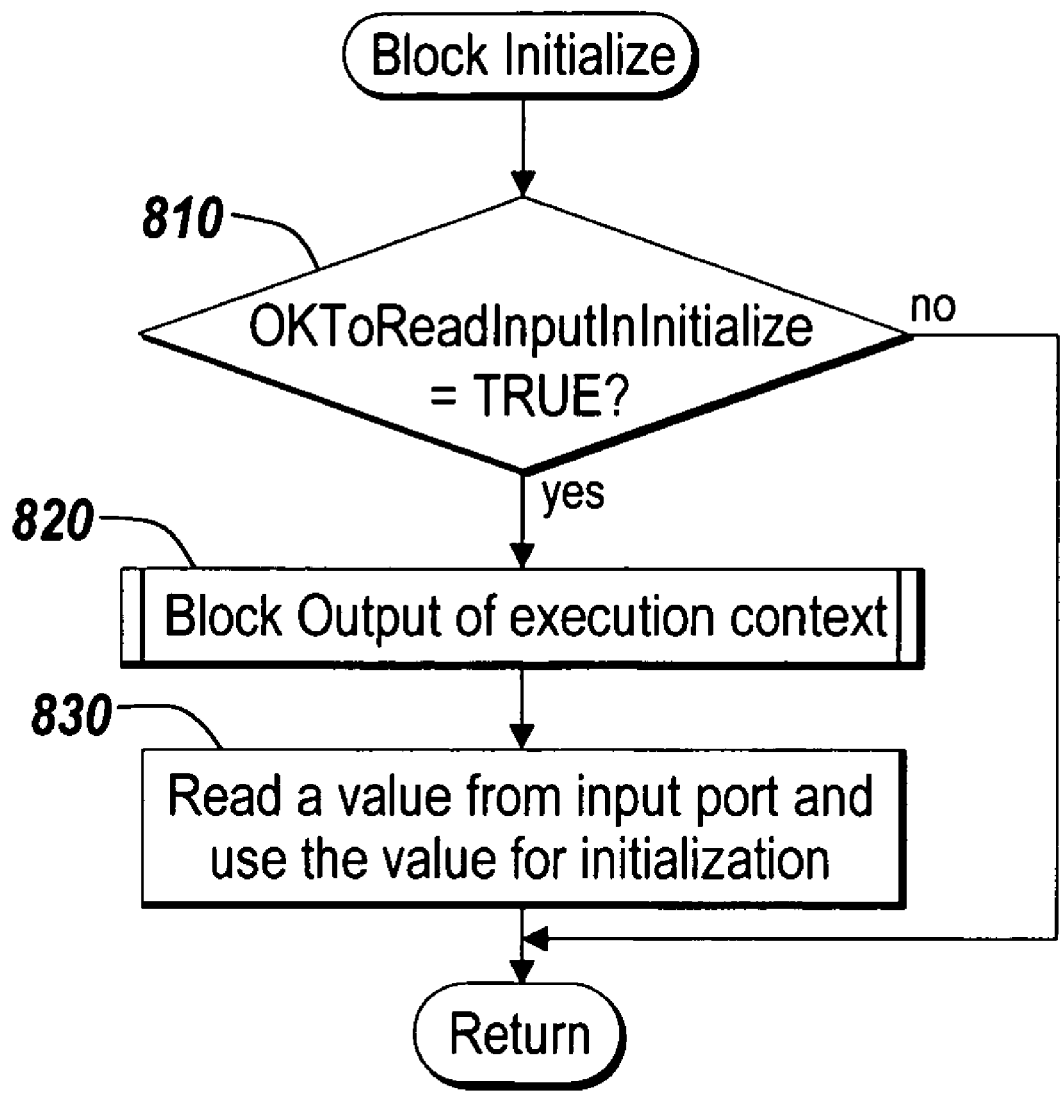
FIG. 25 is a flowchart showing an exemplary operation for the Block Initialize method depicted in FIG. 23.

In Block Initialize (step 692 in FIG. 23), if the flag OKToReadInputInInitialize is TRUE for a block input port, the BlockOutputs method of the execution context 680 is called, and the value from the execution of the execution context 680 is read and used for initializing the states for the Integrator block 660. FIG. 25 is a flow chart showing the exemplary operation of the Block Initialize method in the illustrative embodiment. If the OKToReadInputInInitialize flag of the input port (x0) is TRUE (step 810), the BlockOutputs method of the execution context is called (step 820). In the BlockOutputs method, the execution context 680 is executed using the output signal from the SRC2 block 650 as a precondition for the execution context 680. The value from the execution of the execution context 680 is read from the IC input port (x0) and used for initializing the states for the Integrator block 660 (step 830).

The illustrative embodiment initialize block diagrams efficiently when they need to be initialized using handshaking communications between blocks in the block diagrams. The block initialization of the present invention is adaptive to block connections, and avoids unnecessary block output initialization. In the illustrative embodiment, blocks decide how to initialize their output values through the handshaking communications with other blocks. The handshaking messages are propagated through a collection of blocks and block diagram boundaries. Based on the handshaking communication results, a block can partition the tasks of initializing output signals and states among different block methods (e.g. Block Outputs, Block Initialize and Block Start) in an efficient manner.

This partition enables blocks to be initialized optimally prior to entering a simulation loop using execution contexts technology. Blocks feeding external IC ports are only executed when simulation begins or resetting states happens. The illustrative embodiment of the present invention does not require an extra Boolean flag and an extra if-condition to determine whether it needs to read a value and use this value to initialize the blocks at every simulation loop. Furthermore, the illustrative embodiment of the present invention enhances the readability of the code in the BlockOutputs method because of the extra code for the extra if-condition is removed from the code.

The handshaking mechanism is not just limited to block-diagram initialization. In fact, a block diagram can use this handshaking mechanism for configuring any block attribute that requires information from other blocks. Also, the handshaking mechanism can be used to configure any other entities of a block diagram, such as connections between blocks. A block diagram can use the handshaking mechanism for configuring any connection attribute that requires information from other entities including the blocks and the connections between blocks in the block diagram.

The illustrative embodiment can apply to any executable block diagram paradigm (e.g. time based block diagrams, data flow diagrams, circuit diagrams, mechanical diagrams, etc.), where one block is initialized using the information from other blocks. The handshaking communication mechanisms can be used at any stage of a block diagram based simulation. For example, during block diagram edit, the appearance of a port or block icon may rely on the information from other blocks. For another example, during the simulation, a block diagram may want to reconfigure block attributes, which requires blocks to do a handshaking.

The handshaking mechanism of the illustrative embodiment can apply to the intermediary representation of a block diagram. During the model compilation described above, the block diagram may be converted into an intermediate representation that is used to synthesize the block diagram for execution in simulation and code generation. The intermediate representation is used to sort the blocks into a list of blocks that is used to execute and generate code for the block diagram.

Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any graphical modeling environments. Practitioners of the art will realize that the sequence of steps and architectures depicted in the figures may be altered without departing from the scope of the present invention and that the illustrations contained herein are singular examples of a multitude of possible depictions of the present invention.

What is claimed is:

1. In a computational device that provides a modeling environment, a method for configuring a first entity of a model using information from one or more other entities of the model, the method comprising the steps of:
    enabling the first entity of the model and a portion of the model to perform a handshaking communication with each other to determine whether the portion of the model is able to provide information for configuring the first entity, wherein the portion of the model includes one or more entities of the model; and
    configuring the first entity based on the handshaking communication between the first entity of the model and the portion of the model, wherein the first entity of the model communicates with the portion of the model using handshaking communication flags.

2. The method of claim 1, wherein the portion of the model is configured.

3. The method of claim 1, wherein configuration occurs prior to an execution or simulation loop in which the model is evaluated.

4. The method of claim 1, wherein the step of configuring comprises the step of:
    configuring attributes of the first component based on the communication between the first component of the model and the portion of the model.

5. The method of claim 1, wherein the step of configuring comprises the step of:
    initializing a state of the first entity based on the communication between the first entity of the model and the portion of the model.

6. The method of claim 1, wherein the portion of the model is coupled to an input port of the first entity.

7. The method of claim 1, wherein the step of enabling comprises the steps of:
    the first entity of the model requesting the portion of the model to provide the information for configuring the first entity; and
    each of the entities in the portion of the model providing information on whether each of the entities in the portion of the model is able to provide the information for configuring the first entity.

8. The method of claim 7, further comprising the steps of:
    when all of the entities in the portion of the model are able to provide the information for configuring the first entity, enabling the entities in the portion of the model to provide information for configuring the first entity.

9. The method of claim 1, wherein the modeling environment comprises a block diagram environment.

10. A medium for holding instructions executed in a computer to generate a model in a modeling environment, comprising:
    enabling a first entity of the model to perform a handshaking communication with a portion of the model to determine whether the portion of the model is able to provide information for configuring the first entity, wherein the portion of the model includes one or more entities of the model; and
    configuring the first entity based on the handshaking communication between the first entity of the model and the portion of the model, wherein the first entity of the model communicates with the portion of the model using handshaking communication flags.

11. The medium of claim 10, wherein the portion of the model is configured.

12. The medium of claim 10, wherein configuration occurs prior to an execution or simulation loop in which the model is evaluated.

13. The medium of claim 10, wherein the step of configuring comprises the step of:
    configuring attributes of the first entity based on the communication between the first entity of the model and the portion of the model.

14. The medium of claim 10, wherein the step of configuring comprises the step of:
    initializing a state of the first entity based on the communication between the first entity of the model and the portion of the model.

15. The medium of claim 10, wherein the portion of the model is coupled to an input port of the first entity.

16. The medium of claim 10, wherein the first entity of the model communicates with the portion of the model in a handshaking manner.

17. The medium of claim 10, wherein the step of enabling comprises the steps of:
    the first entity of the model requesting the portion of the model to provide the information for configuring the first entity; and
    each of the entities in the portion of the model providing information on whether each of the entities in the portion of the model is able to provide the information for configuring the first entity.

18. The medium of claim 17, further comprising the steps of:
    when all of the entities in the portion of the model are able to provide the information for configuring the first entity, enabling the entities in the portion of the model to provide information for configuring the first entity; and
    configuring the first entity using the information provided from the portion of the model.

19. The medium of claim 10, wherein the modeling environment comprises a block diagram environment.

* * * * *

UNITED STATES PATENT AND TRADEMARK OFFICE
CERTIFICATE OF CORRECTION

PATENT NO. : 7,313,449 B1
APPLICATION NO. : 11/068948
DATED : December 25, 2007
INVENTOR(S) : John Ciolfi et al.

It is certified that error appears in the above-identified patent and that said Letters Patent is hereby corrected as shown below:

Column 5, line 13, please make the following change:
-- ~~involved~~ involve model quantities. At each time step these relation- --

Table after columns 5 and 6, please replace with the following:
-- rtB_SRC = sys_function( . . . ); --
The _ between sys and function is missing.

Column 12, line 52, please make the following change:
-- Simulink® from The ~~Mathworks~~ MathWorks, Inc. of Natick, Mass., that --

Column 33, line 2, please add the ending parenthesis as follows:
-- Initialize method of the C block 480  and both of --

Table after columns 33 and 34, please make the following changes:
-- rtB_SRC = sys_function( . . . ); --
The _ between sys and function is missing. This error occurs four times within this table.

Signed and Sealed this

Sixth Day of May, 2008

JON W. DUDAS
*Director of the United States Patent and Trademark Office*